United States Patent
England et al.

(10) Patent No.: US 10,104,721 B2
(45) Date of Patent: *Oct. 16, 2018

(54) INDUCTION COOKWARE

(71) Applicant: Bose Corporation, Framingham, MA (US)

(72) Inventors: Raymond O. England, East Greenwich, RI (US); Thomas A. Froeschle, Southborough, MA (US); David W. Beverly, Lunenburg, MA (US)

(73) Assignee: Bose Corporation, Framingham, MA (US)

( * ) Notice: Subject to any disclaimer, the term of this patent is extended or adjusted under 35 U.S.C. 154(b) by 944 days.

This patent is subject to a terminal disclaimer.

(21) Appl. No.: 14/302,467

(22) Filed: Jun. 12, 2014

(65) Prior Publication Data
US 2014/0291316 A1 Oct. 2, 2014

Related U.S. Application Data

(63) Continuation of application No. 12/205,447, filed on Sep. 5, 2008, now Pat. No. 8,796,598, which is a (Continued)

(51) Int. Cl.
*H05B 6/12* (2006.01)
*A47J 27/00* (2006.01)
(Continued)

(52) U.S. Cl.
CPC ............. *H05B 6/12* (2013.01); *A47J 27/002* (2013.01); *A47J 36/02* (2013.01); *H01F 41/00* (2013.01);
(Continued)

(58) Field of Classification Search
CPC .......... A47J 27/002; A47J 31/02; A47J 31/36; A47J 39/00; A47J 41/0077; A47J 41/02; H01F 41/00; H05B 6/12; Y10T 29/4902
See application file for complete search history.

(56) References Cited

U.S. PATENT DOCUMENTS 3,979,572 A * 9/1976 Ito ........................... A47J 36/02
  219/621
4,221,672 A * 9/1980 McWilliams ......... C04B 14/303
  219/460.1

(Continued)

FOREIGN PATENT DOCUMENTS

CN    201452816 U    5/2010
JP    S57-36233 Y2   8/1982
(Continued)

OTHER PUBLICATIONS

CN office action dated Jan. 6, 2015 for CN201280010897.5.
JP office action dated Jul. 22, 2014 for JP2013556820.

*Primary Examiner* — Dana Ross
*Assistant Examiner* — Brandon Harvey

(57) ABSTRACT

An induction cooking utensil is constructed such that it cooks food within its chamber while maintaining a relatively cool outer surface (e.g., preferably an outer surface that is cool enough to pick up with one's bare hands). The cooking utensil includes an inner wall that is made at least in part of an electrically conductive material and an outer wall that is made at least in part of the electrically non-conductive material. A reflective layer, a vacuum-sealed thermal insulator and/or a gas more resistant to conducting heat than air is disposed between the inner and outer walls to resist the transfer of heat from the inner wall to the outer wall.

19 Claims, 15 Drawing Sheets

Related U.S. Application Data continuation-in-part of application No. 12/031,226, filed on Feb. 14, 2008, now abandoned, said application No. 12/205,447 is a continuation-in-part of application No. 12/031,220, filed on Feb. 14, 2008, now abandoned, said application No. 12/205,447 is a continuation-in-part of application No. 12/031,206, filed on Feb. 14, 2008, now abandoned, said application No. 12/205,447 is a continuation-in-part of application No. 12/031,214, filed on Feb. 14, 2008, now abandoned.

(60) Provisional application No. 60/970,785, filed on Sep. 7, 2007, provisional application No. 60/970,766, filed on Sep. 7, 2007, provisional application No. 60/970,775, filed on Sep. 7, 2007, provisional application No. 60/970,795, filed on Sep. 7, 2007.

(51) Int. Cl.
*A47J 36/02* (2006.01)
*H01F 41/00* (2006.01)
*A47J 36/36* (2006.01)
*A47J 39/00* (2006.01)
*A47J 41/00* (2006.01)
*A47J 41/02* (2006.01)

(52) U.S. Cl.
CPC ................ *A47J 36/36* (2013.01); *A47J 39/00* (2013.01); *A47J 41/0077* (2013.01); *A47J 41/02* (2013.01); *Y10T 29/4902* (2015.01)

(56) References Cited

U.S. PATENT DOCUMENTS

| | | | |
|---|---|---|---|
| 5,316,193 A | 5/1994 | Heiberger | |
| 2006/0032266 A1* | 2/2006 | Gagnon | B65D 81/3818 |
| | | | 62/457.2 |

FOREIGN PATENT DOCUMENTS

| | | | |
|---|---|---|---|
| JP | H07-213440 A | | 8/1995 |
| JP | 2006120336 A | * | 5/2006 |
| JP | 2010537789 A | | 12/2010 |

* cited by examiner

INDUCTION COOKWARE

CROSS-REFERENCE TO RELATED APPLICATIONS

This application is a continuation of and claims benefit from U.S. Non-Provisional patent application Ser. No. 12/205,447, which is a continuation in part of U.S. Non-Provisional patent application Ser. No. 12/031,226 filed Feb. 14, 2008 (now abandoned), U.S. Non-Provisional patent application Ser. No. 12/031,220 filed Feb. 14, 2008 (now abandoned), U.S. Non-Provisional patent application Ser. No. 12/031,206 filed Feb. 14, 2008 (now abandoned), and U.S. Non-Provisional patent application Ser. No. 12/031,214 filed Feb. 14, 2008 (now abandoned).

U.S. Non-Provisional patent application Ser. No. 12/031,226 further claims the benefit of and incorporates by reference in their entirety U.S. Provisional Patent Application Nos. 60/970,795 filed Sep. 7, 2007, 60/970,766 filed Sep. 7, 2007, 60/970,775 filed Sep. 7, 2007, and 60/970,785 filed Sep. 7, 2007.

U.S. Non-Provisional patent application Ser. No. 12/031,220 further claims the benefit of and incorporates by reference in their entirety U.S. Provisional Patent Application Nos. 60/970,795 filed Sep. 7, 2007, 60/970,766 filed Sep. 7, 2007, 60/970,775 filed Sep. 7, 2007, and 60/970,785 filed Sep. 7, 2007.

U.S. Non-Provisional patent application Ser. No. 12/031,206 further claims the benefit of and incorporates by reference in their entirety U.S. Provisional Patent Application Nos. 60/970,795 filed Sep. 7, 2007, 60/970,766 filed Sep. 7, 2007, 60/970,775 filed Sep. 7, 2007, and 60/970,785 filed Sep. 7, 2007.

U.S. Non-Provisional patent application Ser. No. 12/031,214 further claims the benefit of and incorporates by reference in their entirety U.S. Provisional Patent Application Nos. 60/970,795 filed Sep. 7, 2007, 60/970,766 filed Sep. 7, 2007, 60/970,775 filed Sep. 7, 2007, and 60/970,785 filed Sep. 7, 2007.

TECHNICAL FIELD

This disclosure relates to cookware for induction cooktops.

BACKGROUND

Some conventional cooktops deliver heat to a cooking utensil (e.g., a pan, pot, skillet, etc.) by for example a gas flame or electric resistance coil. In these cooktops, any material that lies between the heat source and the cooking utensil (e.g., a glass cooktop) is also heated. Induction cooktops work differently. In an induction cooktop, an alternating current in an induction coil produces a time dependent magnetic field that induces eddy currents in electrically conductive materials near the coil, such as a ferromagnetic component (or the target material) of induction cooking utensils. As eddy currents flow within the target material, it becomes hot via a joule heating mechanism. Heat in the target is conducted through the body of the cooking utensil to the food surface, and the food is cooked. Unlike gas or electric cooktops, induction cooktops will not directly heat non-conductive materials (such as a glass cooktop) that are placed between the induction coil and the target material. However, any such non-conductive materials placed between the induction coil and the target material may be indirectly heated by the radiant, convective, or conductive heat emanating from the hot target material.

SUMMARY

Generally, in one aspect, a cooking utensil (such as a stock pot, frying pan, sauce pan, or other type of cookware) for use with an induction cooktop is constructed such that it heats the food/liquid within its chamber to a desired cooking temperature while maintaining a relatively cool outer surface, and preferably an outer surface that is cool enough to pick up with a person's bare hands and immediately set on a wooden (or other) table without damaging it.

In one aspect, a cooking utensil for use with an induction cooktop having an induction coil includes an inner wall that includes an electrically conductive target layer in which heat is generated by the induction coil, an outer wall that includes an electrically non-conductive layer that cooperates with the inner wall to form a sealed gap between the inner wall and the outer wall, and argon gas filling the sealed gap.

Implementations may include, and are not limited to, one or more of the following features. The outer wall may include an impermeable material to aid in reducing the permeation gas molecules through it, and/or may include a passage opening into the gap to permit the gap to be filled with argon or other gas. The inner wall may include a cooking layer and/or a heat spreader layer to conduct heat from the target layer to the cooking layer. The argon gas may be maintained at a pressure less than atmospheric pressure at sea level. The cooking utensil may further include a reflective layer that may be non-contiguous to interrupt a flow of current, a vacuum-sealed thermal insulator, and/or a piece of getter material disposed within the sealed gap within one or both of the bottom portion or side wall portion.

In one aspect, a cooking utensil for use with an induction cooktop having an induction coil includes an inner wall that includes an electrically conductive target layer in which heat is generated by the induction coil, an outer wall that includes an electrically non-conductive layer that cooperates with the inner wall to form a sealed gap between the inner wall and the outer wall; and a vacuum-sealed thermal insulator disposed within the gap and away from contact with the inner wall, wherein the vacuum-sealed thermal insulator is comprised of a thermally resistant material and a pair of sheets enclosing the thermally resistant material in a vacuum.

Implementations may include, and are not limited to, one or more of the following features. The outer wall may include an impermeable material to aid in reducing the permeation gas molecules through it. The inner wall may include a cooking layer and/or a heat spreader layer to conduct heat from the target layer to the cooking layer. The argon gas may be maintained at a pressure less than atmospheric pressure at sea level. The cooking utensil may further include argon gas, a reflective layer that may be non-contiguous to interrupt a flow of current, a vacuum-sealed thermal insulator, and/or a thermal mat that may include an aerogel disposed within the sealed gap within one or both of the bottom portion or side wall portion. The vacuum-sealed thermal insulator may include sheets that include a metalized polymer and/or silicon-dioxide. Where the target layer and the vacuum-sealed thermal insulator are disposed within a bottom portion of the cooking utensil, the vacuum-sealed thermal insulator may extend further across the bottom portion than the target layer.

In one aspect, a method of making a cooking utensil includes joining an outer wall that includes an electrically non-conductive layer to an inner wall that includes an electrically conductive target layer in which heat is generated by an induction coil of an induction cooktop to define a gap between the inner wall and the outer wall to enclose argon gas within the gap.

Implementations may include, and are not limited to, one or more of the following features. The method may further include joining the outer and inner walls in an argon gas environment. The method may further include forming a passage through a portion of the outer wall, filling the gap with argon gas through the passage, and sealing the passage. The method may further include disposing a piece of getter material within the gap, activating the getter material subsequent to joining the outer wall to the inner wall to remove a gas other than the argon from within the gap. The method may further include selecting a quantity and type of getter material to remove a selected quantity and composition of gases from within the gap to achieve a gaseous environment within the gap made up of argon gas at a pressure less than atmospheric pressure at sea level.

Generally, in another aspect, a cooking utensil for use with an induction cooktop includes an inner wall made at least in part of electrically conductive material, an outer wall made at least in part of electrically non-conductive material, and a reflective layer positioned between the inner and outer walls.

Implementations may include one or more of the following. The reflective layer may be formed on the inner surface of the outer wall and the outer surface of the inner wall. The reflective layer may also be a separate layer that lies between the inner and outer walls. In some applications, a layer of thermally resistant material, such as aerogel, may also be placed between the inner and outer walls; the reflective layer may be attached to this layer of thermally resistant material. The reflective layer may be a dielectric or metallic reflector and may cover the bottom portion and/or side wall portion of the cooking utensil. For a metallic (or other electrically conductive) reflector, the thickness of the reflector may be less than its skin depth and/or current interruptions may be etched (or otherwise formed) in the reflector. The cooking utensil may include multiple layers of reflectors and thermally resistant material may be disposed between these multiple layers.

The inner wall of the cooking utensil may include multiple layers of material (e.g., stainless steel and/or aluminum). The inside of the inner wall may include a non-stick coating material. The inner wall may be the innermost wall of the cooking utensil.

The outer wall may be formed of an insulating material. The outer wall may be also formed of different materials, such as one type of material (or combination of materials) for the sidewalls of the cooking utensil (e.g., metal) and another type of materials (or combination of materials) for the bottom portion of the utensil (e.g., a non-conductive window). The outer wall may be the outermost wall of the cooking utensil.

The cooking utensil may be constructed such that there is a gap between the inner and outer walls. In some implementations, a vacuum may be formed within the gap. The vacuum may be formed within the entire gap itself, or an evacuated structure (e.g., a piece of thermally resistant material such as aerogel vacuum-sealed between two sheets of material) may be disposed within the gap. One or both of these sheets of material may be a reflective material. A getter material may be disposed within the vacuum gap to create, preserve or increase the magnitude of the vacuum.

Generally, in another aspect, an induction cooking system may include an induction cooktop (in the form of a surface cooktop, self-standing stove, etc.) and a cooking utensil that includes at least an inner wall made at least in part of electrically conductive material, an outer wall made at least in part of electrically non-conductive material, and a reflective layer positioned between the inner and outer walls. Implementations of the cooking utensil may include one or more of features and/or characteristics recited above.

Generally, in another aspect, a method for manufacturing an induction cooking utensil includes providing an inner wall that includes at least some electrically conductive material, providing an outer wall formed of an electrically non-conductive material, providing a layer of reflective material, and attaching the inner and outer walls such that the layer of reflective material is positioned between the inner wall and outer wall.

Implementations may include one or more of the following. The method may include attaching the reflective layer to an inner surface of the outer wall and/or attaching a layer of thermally resistant material (e.g., aerogel) between the outer wall and the layer of reflective material. The method may include disposing getter material between the inner and outer walls and/or forming a vacuum between the inner and outer wall.

Generally, in another aspect, a cooking utensil includes at least an inner wall made at least in part of electrically conductive material, an outer wall made at least in part of electrically non-conductive material, and a vacuum-sealed thermal insulator disposed between the walls. Implementations may include one or more of the following. The vacuum-sealed insulator may be a thermal insulator (e.g., aerogel) that is vacuum-sealed between two sheets of material. One or both of the sheets of material may be a reflector.

Generally, in one aspect, a cooking utensil for use with an induction cooktop includes an inner wall comprising an electrically conductive material, an outer wall separated from the inner wall by a gap that is devoid of gas such that a vacuum is formed within the gap, and a getter material (such as a Zirconium alloy) disposed within the gap that absorbs at least some gas within the gap.

Implementations may include one or more of the following. The getter material may be heat activated and may have an activation temperature within the normal range of the cooking utensil (e.g., about 100 and 275° C.), or it may be activated at higher temperatures (e.g., about 350 and 500° C.). The vacuum may be formed within the entire gap itself, or a vacuum-sealed thermally resistant material (e.g., aerogel vacuum-sealed between two sheets of material) may be disposed within the gap. The getter material may be disposed within the vacuum gap to create, preserve or increase the magnitude of the vacuum.

The outer wall of the cooking utensil may comprise (or in some cases consist entirely of) an electrically insulating material. The outer wall may be also formed of different materials, such as one type of material (or combination of materials) for the sidewalls of the cooking utensil (e.g., metal) and another type of materials (or combination of materials) for the bottom portion of the utensil (e.g., a non-conductive window). The outer wall may be the outermost wall of the cooking utensil. A reflective layer (e.g., a metallic or dielectric reflector) may be disposed between the inner and outer walls, for example, on the sidewall portion, bottom portion, or both portions of the utensil.

The inner wall of the cooking utensil may include multiple layers of material (e.g., stainless steel and/or aluminum). The inside of the inner wall may include a non-stick coating material. The inner wall may be the innermost wall of the cooking utensil.

Generally, in another aspect, an induction cooking system includes an induction cooktop (in the form of a surface cooktop, self-standing stove, etc.) that includes an induction heating coil and a cooking utensil for use with the cooktop. The cooking utensil includes an inner wall that includes an electrically conductive material, an outer wall separated from the inner wall by a gap that is devoid of gas such that a vacuum is formed within the gap, and a getter material disposed within the gap that absorbs at least some gas within the gap. Implementations of the cooking utensil may include one or more of features and/or characteristics recited above.

Generally, in another aspect, an induction cooking system includes an induction cooktop that includes an induction heating coil and a cooking utensil for use with the cooktop. The cooking utensil includes an inner wall that includes an electrically conductive material, an outer wall separated from the inner wall by a gap that is devoid of gas such that a vacuum is formed within the gap, and a getter material disposed within the gap that absorbs at least some gas within the gap. Implementations of the cooking utensil may include one or more of features and/or characteristics recited above.

Generally, in another aspect, a method for manufacturing an induction cooking utensil includes providing an inner wall that includes at least some electrically conductive material, providing an the outer wall, providing a getter material, and attaching the inner and outer walls such that the getter material is positioned in a gap between the inner wall and outer wall.

Implementations may include one or more of the following. The method may also include forming a vacuum between the inner and outer wall. The method may include attaching the getter material to the outside of the inner wall and/or to the inside of the outer wall. The method may also include activating the getter material after attaching the inner and outer walls (e.g., such that activation of the getter material creates or increases the vacuum between the inner and outer walls). The getter material may have an activation temperature above the normal operating temperate of the utensil. The outer wall of the utensil may be formed of an electrically non-conductive material.

Generally, in one aspect, a cooking utensil for use with an induction cooktop includes an inner wall made at least in part of electrically conductive material and an outer wall having a bottom portion and a sidewall portion. The bottom portion of the outer wall is made at least in part of an electrically non-conductive material and a sidewall portion is formed of a metallic material.

Implementations may include one or more of the following. The electrically non-conductive material of the bottom portion may have an electrical resistivity of greater than about one ohm-meter. The sidewall portion of the outer wall may also include a layer of non-conductive (e.g., insulating) material. The bottom portion of the outer wall may consist entirely of a non-conductive material. The inner wall may be the inner most wall and the outer wall may be the outer most wall.

There may be a gap, such as a vacuum gap, separating the inner and outer walls. And there may be a layer of reflective material (e.g., to reflect radiant heat) and getter material (e.g., to preserve a vacuum gap) between the inner and outer walls. The reflective layer may be formed on the inner surface of the outer wall, or may be a separate layer. The reflective layer may cover only the bottom portion of the pan or it may cover the entire shell of the pan. The reflective layer may be formed of an electrically conductive reflector or a dielectric reflector. A layer of thermally resistant material such as aerogel may separate the inner wall and the reflective layer or the outer wall and the reflective layer. The cooking utensil may include multiple layers of reflective material.

Generally, in another aspect, an induction cooking system may include an induction cooktop (in the form of a surface cooktop, self-standing stove, etc.) and a cooking utensil that includes at least an inner wall made at least in part of electrically conductive material and an outer wall that includes a bottom portion and a sidewall portion. The bottom portion is made at least in part of an electrically non-conductive material and the sidewall portion comprises a metallic material. Implementations of the cooking utensil may include one or more features and/or characteristics recited above.

Generally, in another aspect, a method for manufacturing an induction cooking utensil includes forming an inner wall that includes at least some electrically conductive material and forming an outer layer that includes a bottom portion and a sidewall portion, wherein the bottom portion comprises an electrically non-conductive material which covers substantially all of the bottom portion of the outer wall and a sidewall portion comprises a metal material. The method also includes attaching the inner wall to the outer wall.

Implementations may include one or more of the following. The method may also include disposing a reflective layer between the inner and outer walls, e.g., by attaching a reflective layer to the inside of the outer wall or disposing a separate layer of reflective material between the inner and outer walls. The method may also include disposing a layer of thermally resistant material, such as aerogel, between the inner and outer walls. The method may also include forming a vacuum gap between the inner and outer wall, and may further include disposing getter material between the inner and outer wall to form and/or preserve the vacuum.

Generally, in one aspect, a cooking utensil (such as a stock pot, frying pan, sauce pan, or other type of cookware) for use with an induction cooktop is constructed such that it heats the food/liquid within its chamber to a desired cooking temperature while maintaining a relatively cool outer surface, and preferably an outer surface that is cool enough to pick up with a person's bare hands and immediately set on a wooden (or other) table without damaging it.

Generally, in another aspect, a cooking utensil for use with an induction cooktop includes an inner wall that is made at least in part of an electrically conductive material and an outer wall that is at least partially separate from the inner wall to define a gap. The outer wall includes a plurality of openings that permit circulation of air between the gap and the outside of the cooking utensil.

Implementations may include one or more of the following. The outer wall may be made at least in part of a non-conductive (e.g., insulating) material. The cooking utensil may also include a reflective layer disposed between the inner and outer walls. The openings may be disposed on the bottom and/or sidewalls of the outer wall. The outer wall may also include features to raise the bottom surface from the top of the cook top. The outer wall may be the outermost wall of the cooking utensil.

The inner wall may be formed of multiple layers (e.g., stainless steel, aluminum, etc.). The outside of the inner layer may include a coating of a non-stick material. The inner wall may be the innermost wall of the cooking utensil.

Generally, in another aspect, an induction cooking system includes an induction cooktop and a cooking utensil that includes an inner wall that is made at least in part of an electrically conductive material and an outer wall that is at least partially separated from the inner wall to define a gap.

The outer wall of the cooking utensil includes a plurality of openings that permit circulation of air between the gap and outside of the cooking utensil. Implementations may include one or more of the features and/or characteristics recited above.

Generally, in another aspect, a method for manufacturing an induction cooking utensil includes providing an inner wall that includes at least some electrically conductive material, providing an outer wall that includes a plurality of openings, and attaching the inner wall and the outer wall such that there is a gap defined between the inner and outer walls to permit circulation of air between the gap and the outside of the cooking utensil.

Implementations include one or more of the following. The outer wall may be formed of an electrically non-conductive material (e.g., insulating material). The method may also include disposing a reflective layer between the inner and outer walls.

DETAILED DESCRIPTION

Cookware used with an induction cooktop may be designed to rapidly heat food or liquid while maintaining an outer surface that is cool enough to handle with bare hands or directly place on a wooden dining table (or other heat sensitive surface) without causing damage. To do this, the cookware should be constructed in a way so that any component between the induction coil and the target allows the magnetic field produced by the induction coil to reach the target (that is the component should be essentially invisible to the magnetic field) and also have a high thermal resistance (to abate radiant, convective, and conductive heat transfer from the target material to the outside of the cookware).

Figure 1A:
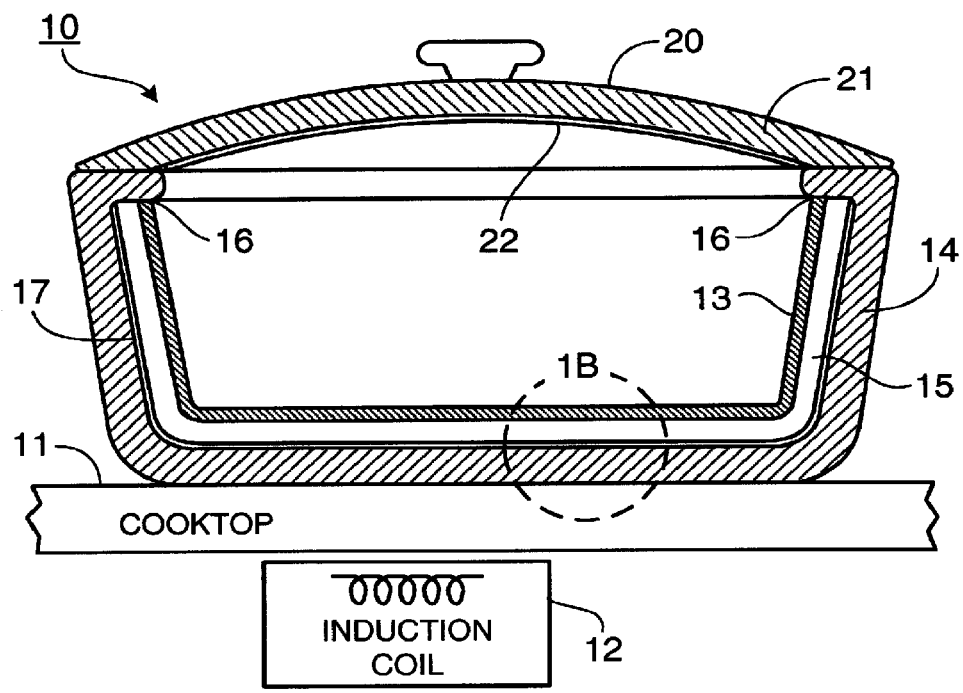
FIGS. 1A and 2 are cross-sectional views of induction cookware.

For example, as shown in FIG. 1A, a cooking utensil 10 sits on the surface 11 of an induction cooktop above the cooktop's induction coil 12. The cooking utensil 10 includes an inner wall 13 and outer wall 14 separated by a vacuum gap 15 and attached at a joint 16. A thin layer of radiant heat reflective material 17 is disposed between the inner and outer walls on the inner surface of the outer wall 14.

The inner wall 13 is the target of the induction coil 12 and is formed of an electrically conductive material, and preferably a ferromagnetic material such as 410 stainless steel. The material of the inner wall 13 may be engineered to have a particular Curie point to help prevent the inner wall 13 from exceeding a predetermined temperature (e.g., 250° C.-275° C.).

The outer wall 14 is designed to stay relatively cool even while the inner wall 13 (and food or liquid within the cooking utensil) is heated to high temperatures for extended periods of time. For example, the induction cooktop may heat the target material to 233° C.-275° C. while the outer surface of the cooking utensil 10 is maintained at about 60° C. or less. In this example, the outer wall 14 is formed at least in part, of an electrically non-conductive material (e.g., an insulator having a resistivity greater than about one ohm-meter), such as glass ceramic, glass, or plastic (e.g., a plastic such as polyether sulfone resin (PES), Liquid Crystal Polymer (LCP), or Polyetheretherketone (PEEK)). For implementations that include a vacuum gap 15 between the inner and outer walls, the material of the outer wall 14 is also preferably formed of material that is impermeable to atmospheric gasses, and either inherently does not outgas, or is provided with a barrier material which prevents outgas sing (to preserve the vacuum). Applications which include a vacuum gap 15 (pressures of between 0.001 and 1 torr) significantly reduce both conductive and convective heat transfer from the target surface to the outer surface.

Figure 1B:
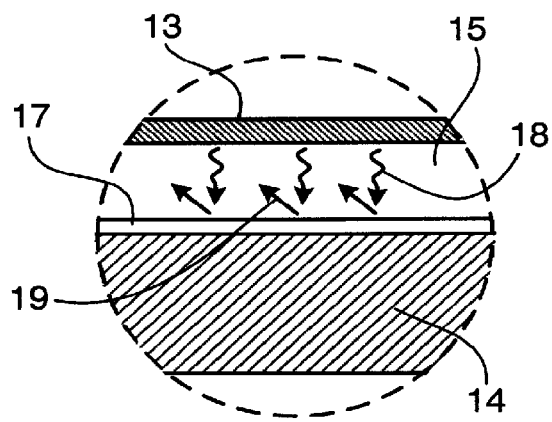
FIG. 1B is a detailed cross-sectional view of a portion of the cooking utensil shown in FIG. 1A.

The thin layer of reflective material 17 reflects a significant portion of the radiant heat radiated by the inner wall 13 (i.e., the target of the induction coil) away from the outer surface, thus helping to keep the outer wall 14 relatively cool. This reflective layer 17 may be formed of any material having a high reflectance (e.g., greater than 80% and preferably between 90-100%) and low emissivity (e.g., an emissivity less than about 0.20 and preferably around 0.01-0.04) for radiation in the infrared and visible electromagnetic spectra (e.g., radiation having a wavelength of between 0.4 $\mu$m and $1 \times 10^4$ $\mu$m). As shown in FIG. 1B, heat 18 radiated from the inner wall 13 is reflected 19 by the reflective layer 17 away from the outer wall 14. This permits the cooking utensil 10 to have a thinner cross-sectional profile than would otherwise be required to maintain the temperature differential between the inner and outer walls. (A cooking utensil without the reflective layer 17 would require a larger insulation gap and/or thicker outer wall to maintain the same temperature differential). In such cases, the target is moved further away from the induction coil 12, thus increasing the energy usage of the coil 12 and reducing the coupling efficiency between the coil 12 and the target.

The reflective layer 17 may lie between the induction coil 12 and the target (as is shown in FIG. 1A), and, as such, the reflective layer 17 should be designed to prevent it from attenuating a significant portion of the magnetic field. In other words, the reflective layer 17 should be designed to be essentially invisible to the magnetic field created by the induction coil 12. For example, in some implementations the reflective layer 17 may be formed of a dielectric material which is non-conductive and thus does not attenuate the magnetic field. However, in some implementations the reflective layer 17 may be formed of a conductive material such as a metal (e.g., pure or alloy forms of gold, silver, aluminum, palladium, nickel, etc.). In this case, the conductive reflective layer 17 is made thin enough to prevent it from attenuating a significant portion of the magnetic field produced by the induction coil 12. The thickness of a conductive reflective layer 17 may be designed to be less than the skin depth of the material (at the frequency of operation of the induction coil). For example, in the cooking utensil 10 example of FIGS. 1A-1B the reflective layer 17 is formed of silver and has a thickness of on the order of about $1000 \times 10^{-10}$ meters (the figures including FIGS. 1A-1B are not drawn to scale), which is about three orders of magnitude less than the skin depth of silver (approximately $3.7 \times 10^{-4}$ meters at 30 kHz). Also, some percentage of the conductive reflective layer 17 may be etched away to create interruptions in the current path. Breaking the current path that would otherwise be induced in the reflective layer 17 by the field (e.g., etching a grid or other pattern in the reflective layer) may allow for design of a thicker conductive reflector (e.g., reflective layers that are roughly equal to or exceeding the skin depth of the material at the induction coil frequency of operation).

The reflective layer 17 may be formed using any known technique for the particular material. For example, a dielectric reflective layer such as Spectraflect® by Labsphere in North Sutton, N.H. USA (www.labspere.com) may be coated onto the inner surface of the outer wall 14. Other dielectric reflectors may be produced in sheets and may be adhered to the outer wall 14. Other metallic reflectors may be coated on thin-film polymeric substrates such as Kapton® by E. I. du Pont de Nemours and Company, Wilmington, Del., USA, which in turn may be adhered to the outer wall 14. Additionally, evaporation coating may be used to deposit a thin layer of a metallic reflector on the inner surface of the outer wall 14.

It should be noted that the reflective layer 17 need not be attached to the outer wall 14. In some implementations, the reflective layer 17 may be disposed on the outer surface of the inner wall 13. In other implementations, the reflective layer 17 may be a separate structure disposed between the inner and outer walls; for example, a layer of thermal insulating material (e.g., aerogel) may be disposed between the inside of the outer wall 14 and the reflective layer 17.

Referring again to FIG. 1A, the cooking utensil 10 includes a lid 20 that is formed of a thermally insulating material 21 and includes a layer of reflective material 22 on its inner surface. This layer of reflective material 22 reflects heat radiated from the inside of the cooking utensil 10 away from the exterior surface of the lid 20, thus helping to keep the lid 20 cool and the chamber of the cooking utensil 10 warm.

The joint 16 between the inner and outer walls may be formed using any known joining technique (e.g., joining with a high-temperature adhesive, mechanical seal (such as an o-ring), or a brazed joint). For implementations that include a vacuum gap 15 between the inner and outer walls (such as shown in FIGS. 1A-1B), the gap 15 between the inner and outer walls may be evacuated during the joining process, or the joining process may take place in a vacuum chamber.

In an implementation that includes a vacuum gap 15, the pressure in the gap 15 will increase over time regardless of the materials selected for the walls 13, 14 and the quality of the joint 16 due to outgassing of the bulk materials and leakage at the joint 16. Metallic and glass/glass ceramic materials will outgas very slowly, while polymeric materials will outgas relatively rapidly. As the pressure increases, the thermal resistance of the cooking utensil 10 diminishes. One technique for helping to slow the leakage of gas into a vacuum gap 15 for a polymeric material is to seal the outer wall 14 using a thin film coating such as an ultra low-outgassing epoxy or a metallic coating. In addition, however, a getter material may be disposed between the inner and outer walls to help preserve the vacuum over time (and thus also helping to maintain the cookware's thermal resistance over time).

Figure 2:
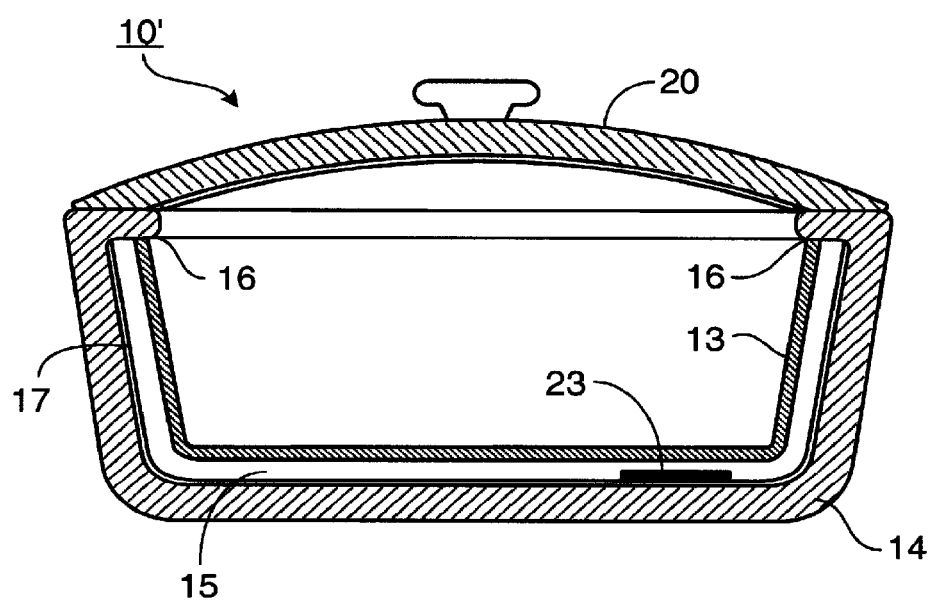

For example, as shown in FIG. 2, a cooking utensil 10' is identical in construction to the example shown and described in FIG. 1 except that it includes an amount of a getter material 23 (e.g., a Zirconium-based alloy available from SAES Getters S.p.A. in Milan, Italy (www.saesgetters.com)) attached (e.g., by welding or adhering) to the inside of the outer wall 14 in the gap 15. The getter material 23 may be pre-activated and installed into the cookware 10' in an active state, or alternatively, it may be installed in an inactive state and then activated by heating the cookware 10' after assembly. When the getter material 23 is in an active state, it will absorb gas (e.g., $N_2$, $O_2$, CO, and $CO_2$) that has leaked into the gap 15 between the inner and outer walls and thus preserves the vacuum.

Getter material 23 may also be used to reduce the pressure existing between the inner and outer chambers. For example, a larger amount of getter material may be placed between the inner and outer walls and then activated after the walls 13, 14 are joined to form the vacuum, however the getter will not absorb Argon gas, which is present in the atmosphere. Alternatively, the air in the gap 15 between the inner and outer walls may be evacuated during the joining process to achieve a vacuum at a certain magnitude (e.g., 1 torr) and then getter material may be activated to increase the magnitude of the vacuum (e.g., to $1 \times 10^{-3}$ torr).

Figure 3A:
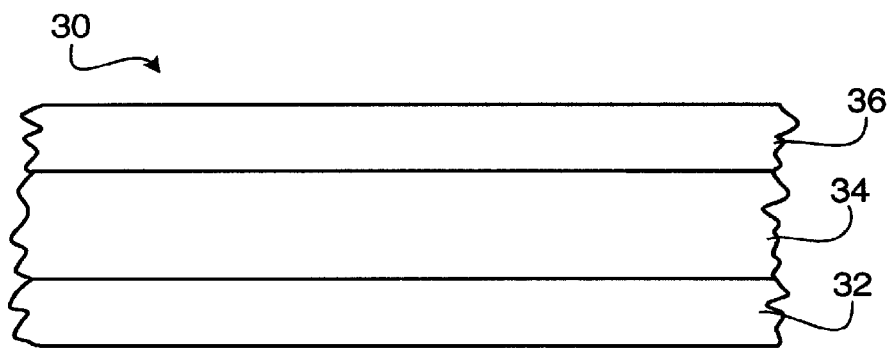
FIGS. 3A-3B are partial cross-sectional views of an inner wall of an induction cooking utensil.
Figure 3B:
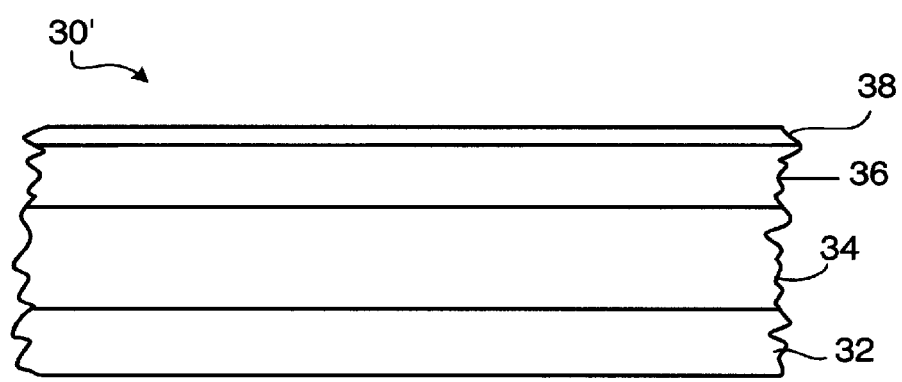

While the cookware 10, 10' illustrated thus far show single layer inner and outer walls, other implementations may use multi-layered inner and/or outer walls. For example, as shown in FIG. 3A, an inner wall of an induction cook cooking utensil 30 includes a three-layer design that includes a lower layer 32, middle layer 34, and upper layer 36. The lower layer 32 is formed of a material designed to be a good target for the induction coil 12, such as 410 stainless steel having a thickness of roughly 0.76 mm. The middle layer 34 is formed of a material, such as 1060 aluminum, that effectively and evenly spreads heat generated in the target material. Finally, the upper layer 36 is formed of a material such as 305 stainless steel having a thickness of about 0.8 mm. FIG. 3B shows a similar multi-layered design, except in this example, a non-stick layer 38 (e.g., PEEK available from Victrex Company in Conshohocken, Pa. (www.victrex.com), or Teflon® available from E. I. du Pont de Nemours and Company in Wilmington, Del. (www.dupont.com)) is applied on the uppermost surface of the inner wall 36 to help prevent food and liquid from sticking to the cooking utensil 30'.

Figure 4A:
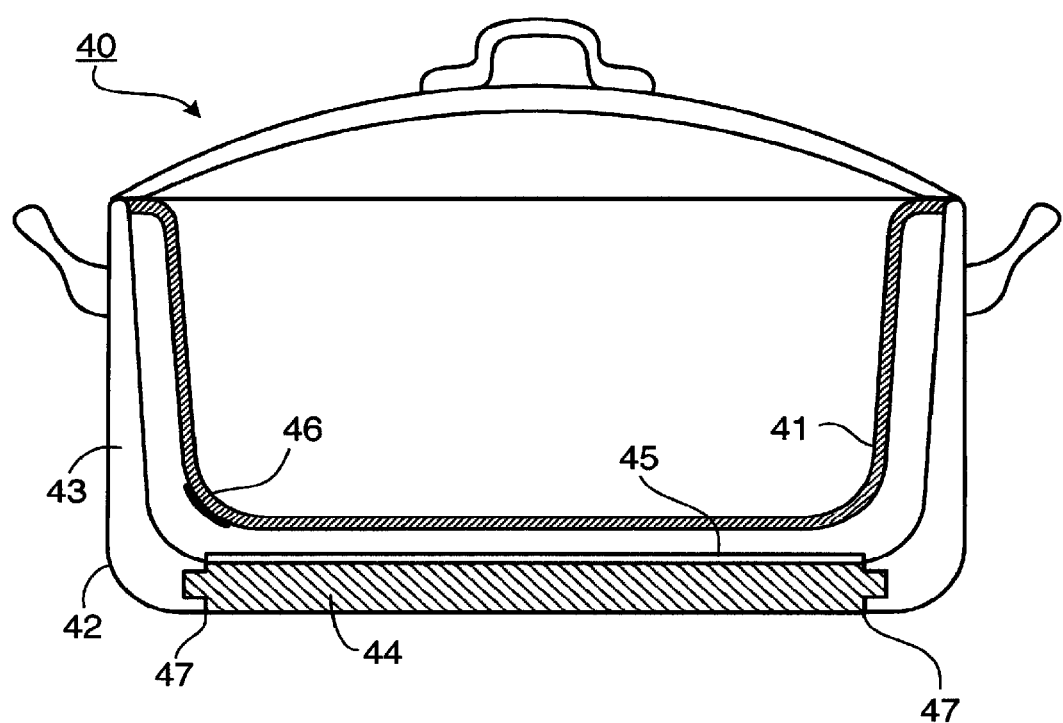
FIG. 4A is a cross-sectional view an induction cooking utensil.
Figure 4B:
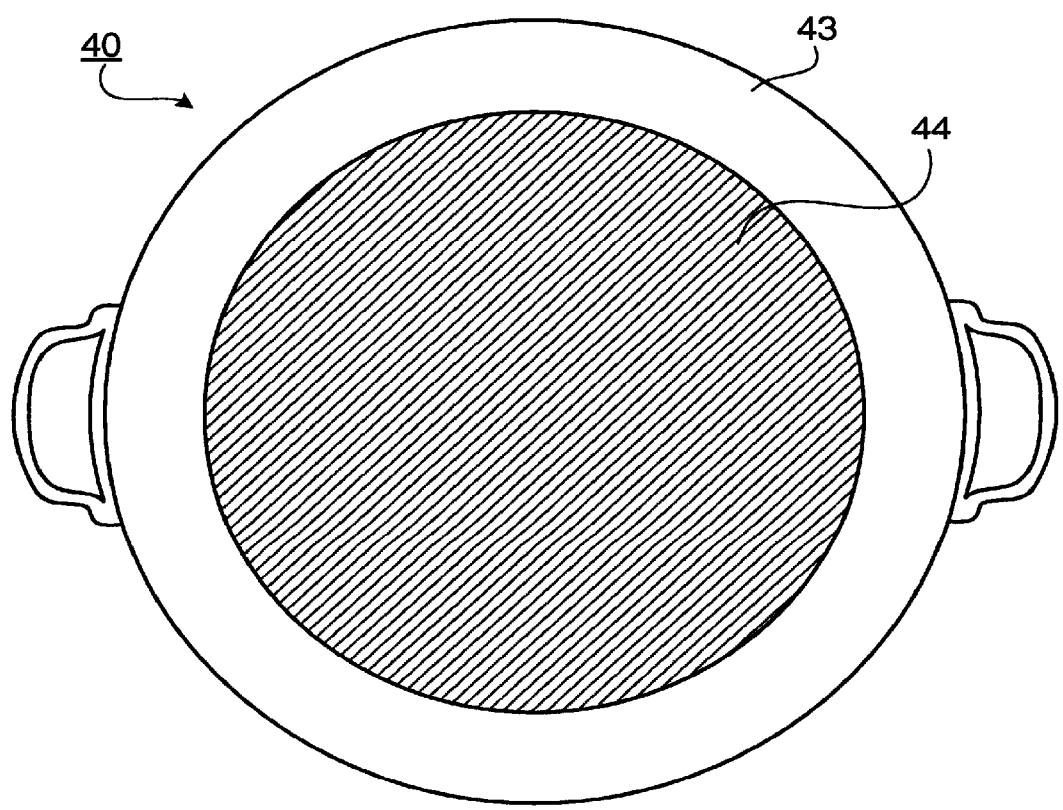
FIG. 4B is a bottom view of the cooking utensil shown in FIG. 4A.

Referring now to FIGS. 4A-4B, an induction cooking utensil 40 is similar in construction to the cooking utensil 10 shown and described in FIGS. 1A-1B. However, in this example, the outer wall 42 includes a sidewall 43 formed of a metallic material and a window 44 formed of an electrically insulating material. Additionally, the reflective layer 45 is disposed only on the bottom of the cooking utensil, and not along its sidewalls 43 as is shown in FIGS. 1A-1B. In this design, the cooking utensil 40 has the look of a conventional metallic cooking utensil, yet still has a high enough thermal resistance between the inside of the inner wall 41 and the outside of the outer wall 42 to maintain a relatively cool outer shell.

The insulating window 44 may be attached to the metallic sidewall 43 using any known technique for the materials selected, such as, brazing, insert molding, or attaching using an adhesive or a mechanical seal. The joint 47 between the insulating window 44 and metallic sidewalls 43 is preferably air-tight to preserve the vacuum. A piece of getter material 46 is also attached to the outside of the inner wall 41 to preserve the vacuum over time. Any electrically non-conductive material may be used for the window, such as glass-ceramics (e.g., Robax® or Ceran® available from Schott North America, Inc in Elmsford, N.Y. (www.us.schott.com)), technical glasses (e.g., Pyrex® available from Corning Incorporated in Corning, N.Y. (www.corning.com), ceramic white ware (CorningWare® available from Corning Incorporated), or plastic (e.g., PES LCP, or PEEK). In some implementations, the insulating window 44 may extend up into the sidewall portions 43 of the outer wall 42, while a metallic sidewall 43 may be attached to the outer surface of the insulating window 44 on the side of the cooking utensil 40.

Figure 5A:
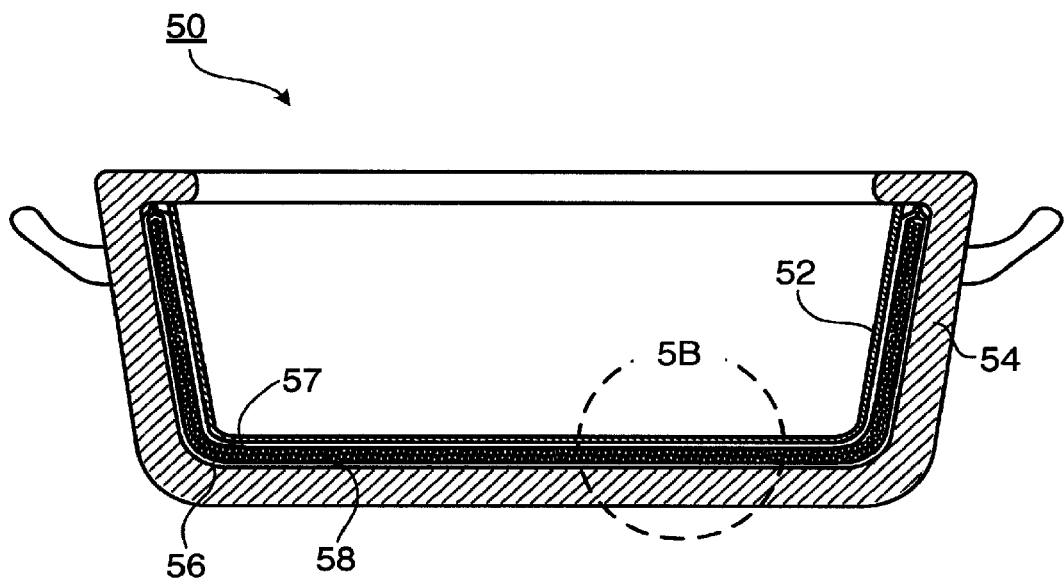
FIGS. 5A and 5C are each a cross-sectional view of an induction cooking utensil.
Figure 5B:
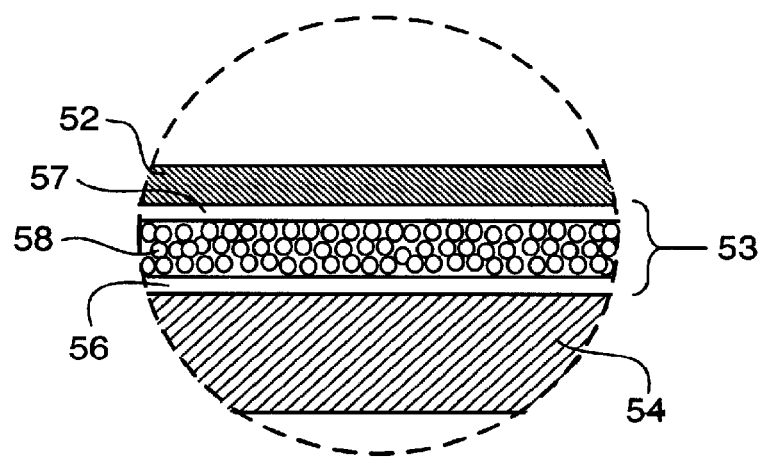
FIGS. 5B and 5D are each a detailed cross-sectional view of a portion of the cooking utensil shown in FIGS. 5A and 5C respectively.

In some implementations, an induction cooking utensil may not have a vacuum gap that separates the inner and outer walls. For example, as shown in FIG. 5A-5B, an induction cooking utensil 50 includes an inner wall 52 formed of an electrically conductive material and an outer wall 54 formed of an electrically non-conductive material that is separated by a non-vacuum gap. A vacuum-sealed thermal insulator 53 is disposed within the gap and includes a thermally resistant material 58 that is vacuum-sealed between two sheets of material 56, 57. One or both of the sheets of material 56, 57 may be a reflective material to help reflect radiant heat away from the outer wall 54. For example, a layer of Nanopore™ thermal insulating material available from Nanopore, Inc. in Albuquerque, N. Mex. (www.nanopore.com) may be used between the inner and outer walls. In other implementations, non-reflective sheets of material 56, 57 may be used to vacuum-seal the thermally insulating material 58 and one or more reflective layers may be disposed on the inside of the outer wall 54 (such as what is shown in FIG. 1A-1B), disposed as a separate layer in the gap, and/or disposed on the outside of the inner wall 52. Also, in some implementations a vacuum-sealed member 53 may not line the entire gap separating the inner and outer walls as shown, but may line only a portion, such as the bottom portion of the utensil 50.

Figure 5C:
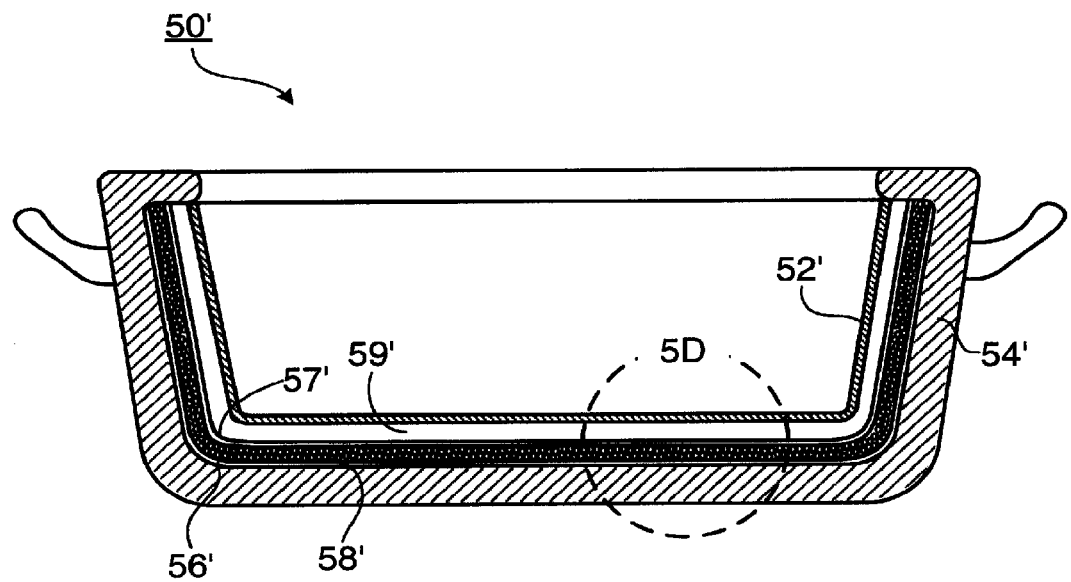
Figure 5D:
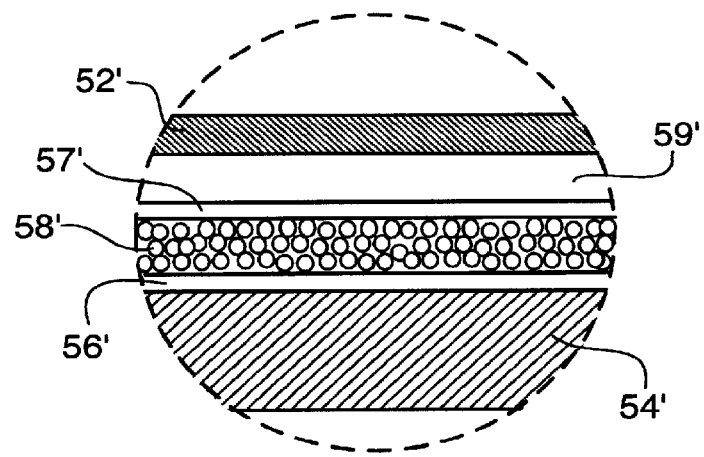

In another example shown in FIGS. 5C-5D, an induction cooking utensil 50' is similar in construction as to the cooking utensil 50 shown in FIGS. 5A-5B. However, in this example, there is no vacuum existing between the inner and outer walls. More particularly, the induction cooking utensil 50' includes an inner wall 52' formed of an eclectically conductive material and an outer wall 54' formed of an electrically non-conductive material that is separated by a non-vacuum gap. The gap includes a first reflective layer 56' disposed on the inner surface of the outer wall 54' and a layer of thermally resistant material 58' (such as aerogel) disposed on top of the first reflective layer 56'. A second reflective layer 57' is disposed on top of the layer of thermally resistant material 58'. In this implementation, an air gap 59' exists between the inner and outer walls above the second reflective layer 57'. Note also that this implementation includes two reflective layers. The upper reflective layer 57' reflects heat radiated from the inner wall 52' away from the outer wall 54'. The lower reflective layer 56' reflects heat radiated from inner wall 52' and the upper reflective layer 57' away from the outer wall 54'. The thermally resistant material 58' is preferably of a type that is a good thermal insulator (such as a carbon aerogel or a silica aerogel with carbon). While two layers of reflectors 56', 57' are illustrated in FIGS. 5C-5D, other implementations may use additional layers of reflectors. Similarly, some implementations may use a single reflective layer that is separated from the inner or outer wall (or both) by a layer of thermally resistant material.

Figure 6A:
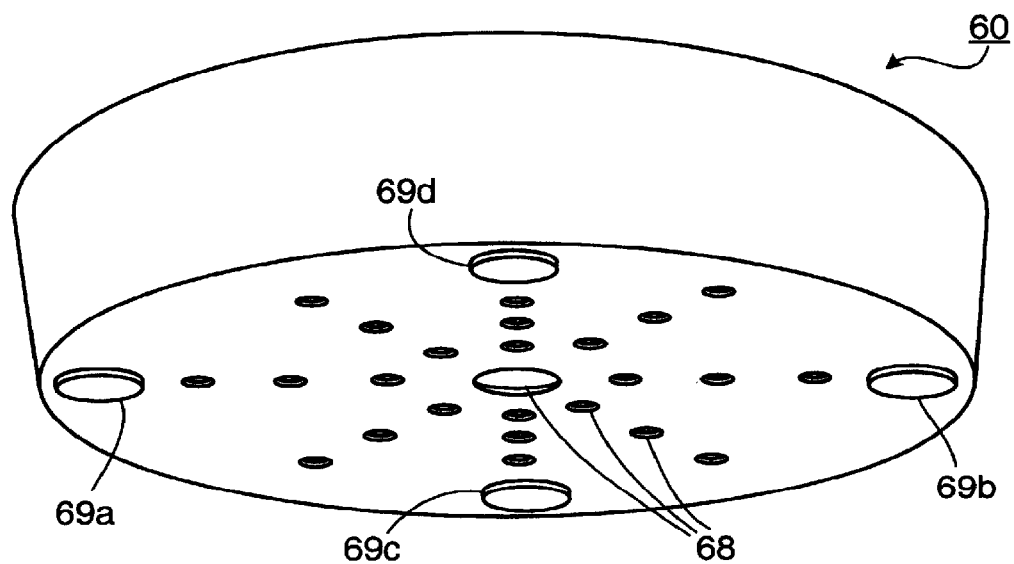
FIG. 6A is a perspective view of an induction cooking utensil.
Figure 6B:
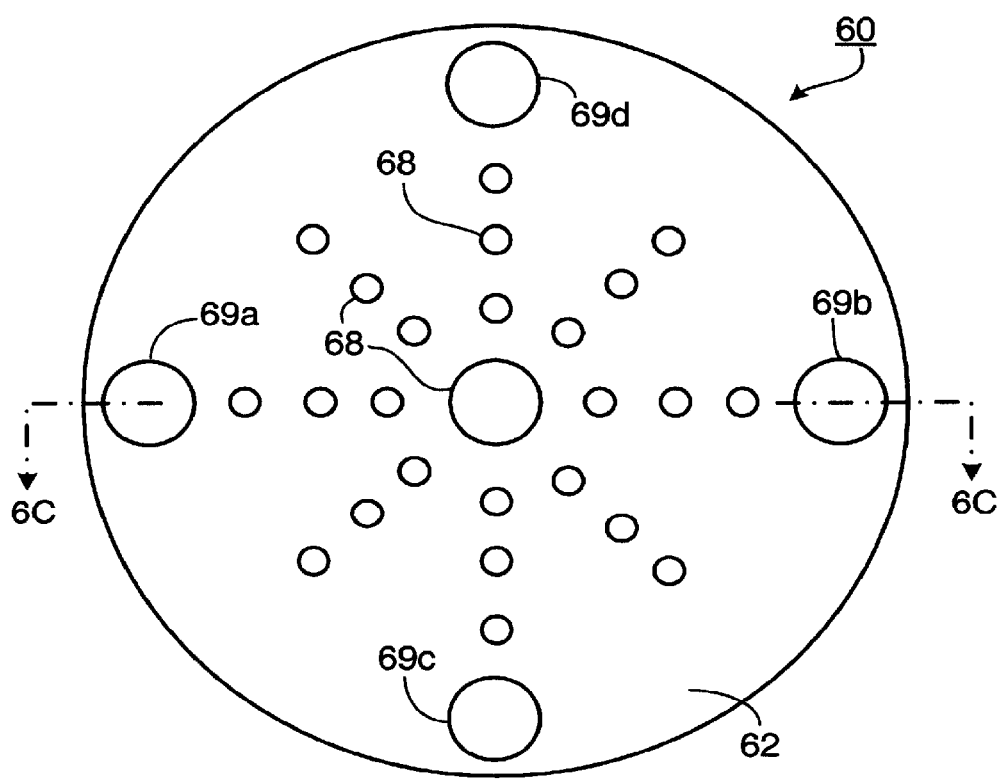
FIG. 6B is a bottom view of the cooking utensil shown in FIG. 6A.
Figure 6C:
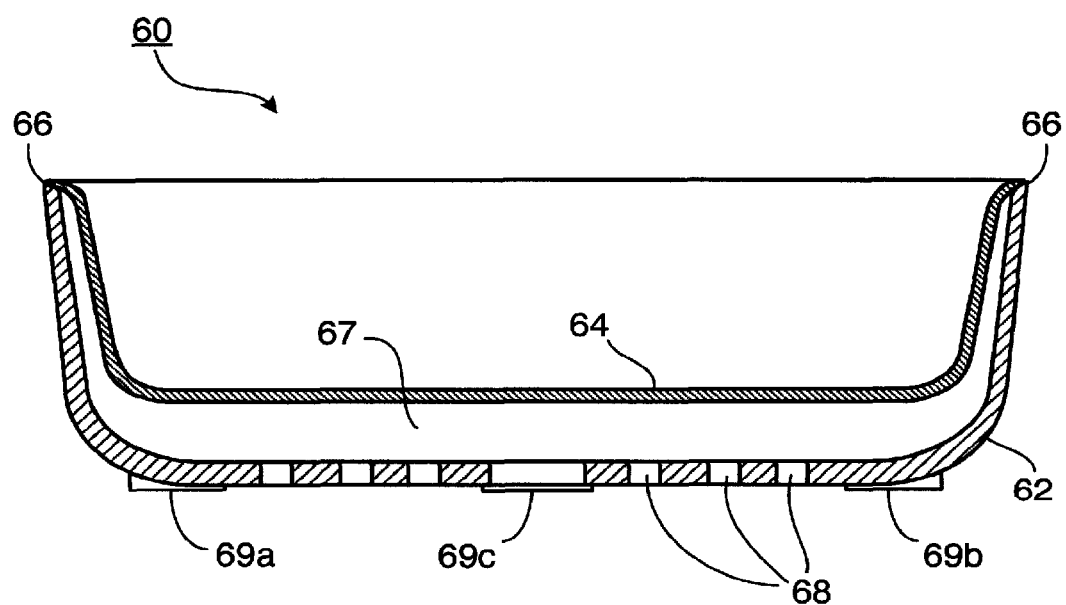
FIG. 6C is a cross sectional view of the cooking utensil shown in FIGS. 6A-6B.

A cooking utensil may also include openings in its outer wall to promote convective cooling of the outer wall. For example, as shown in FIG. 6A-6C an induction cooking utensil 60 includes an inner wall 64 formed of an electrically conductive material and an outer wall 62 formed of an electrically non-conductive material that is attached at a joint 66. In this case, the outer wall 62 includes a number of openings 68 on its bottom surface to promote airflow through the gap 67 separating the inner and outer walls. Cooking utensil 60 also includes features 69a-69d to slightly raise the bottom of the outer wall 62 from the surface 11 of the cooktop, and thus more freely permit airflow through openings 68. The inner and outer walls may be attached at the joint 66 using any of the techniques described above. While this particular example shows openings 68 only on the bottom surface of the outer wall 62, other implementations may include openings only on the sidewall or both on the sidewall and bottom surface of the outer wall 62. Additionally, other implementations may include one or more reflective layers to further assist in keeping the outer wall 62 relatively cool. It should also be noted that features similar to features 69a-69d shown in FIG. 6A-6C may be used in any of the other implementations described herein to promote airflow between the bottom surface of the cooking utensil and the top surface 11 of the cook top.

Figure 7:
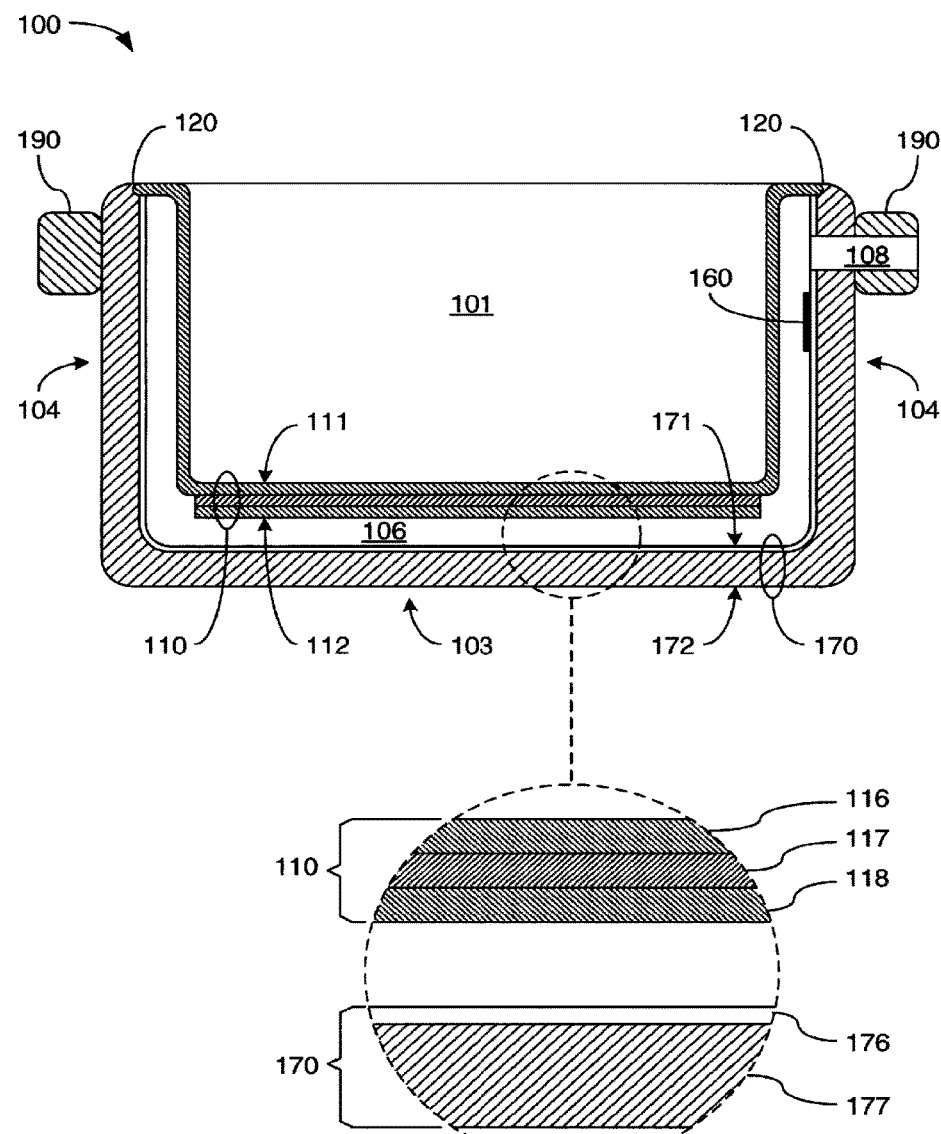
FIG. 7 is a cross-sectional view an induction cooking utensil.

FIG. 7 depicts a cooking utensil 100 that is substantially similar to the cooking utensil 10' of FIG. 2. Like the cooking utensil 10', the cooking utensil 100 incorporates an inner wall 110 and an outer wall 170 that are both of a pan-like shape with the inner wall 110 nested within the outer wall 170, defining a gap 106 between them into which a piece of getter material 160 may be disposed. Also like the cooking utensil 10', the inner wall 110 is joined at a continuous annular joint 120 to the outer wall 170, thereby fully enclosing the gap 106. However, unlike the cooking utensil 10', the cooking utensil 100 incorporates a pair of handles 190 through one of which may be formed a sealable passage 108 opening into the gap 106 and through which the gap 106 may be filled with a gas that substantially resists transmitting heat between the inner wall 110 to the outer wall 170.

The inner wall 110 has an inner surface 111 defining a cooking chamber 101 within the recess of its pan-like shape into which liquids and/or food are placed for cooking, and the inner wall 110 has an outer surface 112 that faces the outer wall 170. Within side wall portions 104 of the cooking utensil 100, the inner wall 110 incorporates a cooking layer 116 formed from material appropriate for use as a cooking surface (e.g., 305 stainless steel). However, within the bottom portion 103 of the cooking utensil 100, the inner wall 110 additionally incorporates a spreader layer 117 formed from material appropriate for use as a heat spreader (e.g., 1060 aluminum), and a target layer 118 formed of an electrically conductive material (preferably ferromagnetic) appropriate for use as a target of an induction coil of an induction cooktop (e.g., 410 stainless steel). The cooking layer 116 defines substantially all of inner surface 111 of the inner wall 110, while the outer surface 112 is defined by the cooking layer 116 within the side wall portions 104 and by the target layer 118 within the bottom portion 103. It should be noted that despite this depiction of a combination one-layer and three-layer inner wall 110, other implementations may incorporate a layer of non-stick material disposed on the inner surface 111 (e.g., PEEK or a PTFE (polytetrafluoroethylene) composite coating).

Heat is generated in the target layer 118 of the inner wall 110 by a magnetic field generated by an induction coil of an induction cooktop (e.g., the induction coil 12 depicted in FIG. 1A). The material of the target layer 118 may be selected and/or worked to have a particular Curie point to tend to prevent the inner wall 110 from exceeding a predetermined temperature or range of temperatures (e.g., 230° C.-260° C. or 250° C.-275° C.). The spreader layer 117 conducts the heat generated in the target layer 118 to the cooking layer 116 while also spreading that heat more evenly so that at least the portion of the cooking layer 116 that is within the bottom portion 103 is able to provide a more evenly heated cooking surface.

The outer wall 170 has an inner surface 171 that faces the inner wall 110, and the outer wall has an outer surface 172 defining the exterior of its pan-like shape, and thereby defining much of the exterior of the cooking utensil 100. The outer wall 170 incorporates a reflective layer 176 formed from material appropriate to reflect heat, and an electrically non-conductive layer 177 formed from material appropriate to serve as a heat insulator. The reflective layer 176 defines substantially all of the inner surface 171 of the outer wall 170, and the non-conductive layer 177 defines substantially all of the outer surface 172. It should be noted that despite this depiction of a two-layer outer wall 170, other implementations may not incorporate the reflective layer 176 and/or may incorporate a layer of enamel or other decorative material disposed on the outer surface 172. Further, despite this depiction of the reflective layer 176 being within both the bottom portion 103 and the side wall portions 104, other implementations may incorporate the reflective layer 176 in only one or the other of the bottom portion 103 or the side wall portions 104.

The reflective layer 176 is formed from a material having a high reflectance (e.g., greater than 80% and preferably between 90-100%) and low emissivity (e.g., less than about 0.20 and preferably around 0.01-0.04) for electromagnetic waves in the infrared and visible spectra (e.g., having a wavelength of between 0.4 μm and $1\times10^4$ μm). In some implementations, the reflective layer 176 is formed of a non-conductive dielectric material that is substantially invisible to a magnetic field (e.g., Spectraflect®). In other implementations, the reflective layer 176 is formed of a conductive material that has been etched or otherwise segmented to interrupt paths of currents that may be induced in the reflective layer 176 by a magnet field generated by an induction coil to help avoid heating of the reflective layer and to help avoid attenuating that magnetic field.

The non-conductive layer 177 is at least partly formed of an electrically non-conductive material (e.g., an electrical insulator having a resistivity greater than about one ohm-meter) to help enable the magnetic field generated by an induction coil of an induction cooktop to penetrate the outer wall 170 and reach the target layer 118 of the inner wall 110 substantially unimpeded. The material of the non-conductive layer 177 also substantially resists conducting heat. Further, the material of the non-conductive layer 177 is preferably impermeable to atmospheric gases and inherently does not outgas, or incorporates a barrier material that tends to prevent permeation and outgas sing. Examples of appropriate non-conductive materials from which to form the resistive layer 177 include, and are not limited to a composite, a ceramic (e.g., Robax®, Ceran® or Pyrex®), or a plastic (e.g., PES, LCP or PEEK). Examples of appropriate barrier materials to incorporate into the resistive layer 177 include, and are not limited to, an ultra low-outgas sing epoxy or a metal coating.

The joint 120 at which the inner wall 110 and the outer wall 170 meet may be formed using any of a variety of joining and sealing techniques including, and not limited to, brazing, adhesive bonding, or an o-ring. As depicted, the joint 120 is formed where portions of the inner wall 110 extend outward and engage portions of the outer wall 170 at which the inner wall 110 is partially inset into the outer wall 170. The joint 120 cooperates with these portions of the inner wall 110 and the outer wall 170 to form a gas-tight seal that separates the environment within the gap 106 from the environment external to the gap 106. The gap 106 encloses an environment incorporating a gas that substantially resists transmitting heat from the outer surface 112 of the inner wall 110 to the inner surface 171 of the outer wall 170 (e.g., argon).

As discussed at length above, enclosing a vacuum (e.g., a gaseous environment at a pressure of less than $1\times10$-4 torr, or thereabouts) within the gap 106 is highly effective at inhibiting the transfer of heat across the gap 106. In temperatures normally associated with cooking, the low density of gas molecules in such a vacuum substantially precludes the transfer of heat by conductance, since instances of gas molecules vibrating against other gas molecules to conduct heat is substantially precluded. Therefore, in such temperatures, such a vacuum substantially limits the mechanisms for the transfer of heat to that of radiation, which is considerably less efficient in transferring heat than conduction through a gas. However, despite being so effective in inhibiting heat transfer, enclosing such a vacuum within the gap 106 can be problematic inasmuch as the resulting difference in pressure between the vacuum within the gap 106 and the environment external to the gap 106 can result in portions of the outer wall 170 being pressed into the gap 106 and closer to the inner wall 110. Filling the gap 106 with a gas reduces this difference in pressure which helps to alleviate this problem, and may thereby enable portions of the outer wall 170 to be made thinner to reduce costs and/or weight, or may thereby enable the non-conductive layer 177 to be made from material with desirable thermal characteristics that would have otherwise been too soft.

It is preferred that the gap 106 be filled with a gas that is more resistant to conducting heat across the gap 106 than air (e.g., argon), and that the pressure of this gas be selected to balance providing substantial resistance to conducting heat across the gap 106 with providing sufficient pressure within the gap 106 to prevent portions of the outer wall 170 from being pressed into the gap 106. The lower the pressure of the gas within the gap 106, the greater the resistance to conducting heat, since there is a lower density of gas molecules vibrating against other gas molecules to conduct heat resulting in reduced efficiency in heat transfer through conductance.

The gap 106 may be filled with a gas in any of a variety of ways including, and not limited to, assembling the cooking utensil 100 in a chamber filled with the gas at a desired pressure, or filling the gap 106 with the gas at a desired pressure subsequent to joining the inner wall 110 to the outer wall 170. The passage 108 may be employed during or subsequent to the assembly of the cooking utensil 108 to draw out undesired gases from within the gap 106 and/or to fill the gap 106 with a desired gas at a desired pressure (either less than or equal to atmospheric pressure at sea level). The passage 108 may be tapered or may employ threads or other shaping to enabling a plug or valve (neither shown) to be retained within the passage 108 to seal the gap 106, and perhaps permit the gap 106 to be subsequently unsealed without damaging or disassembling the cooking utensil 100. The passage 108 may be formed partially through one of the handles 190 either to enable the formation of a longer form of the passage 108 to accommodate a larger plug or valve, or to enable the passage 108 to be more easily concealed from view to enhance the aesthetics of the cooking utensil 100.

The getter material 160 may be disposed within the gap 106 to help either create or maintain a desired gaseous environment within the gap 106. The getter material 160 may be of any of a variety of materials capable of removing any of a variety of different gases (e.g., oxygen, hydrogen, or nitrogen) or combinations of gases from the environment within the gap 106. In some implementations, the getter material 160 may be activated subsequent to the assembly of the cooking utensil 100 to remove one or more gases from within the gap 106 to leave behind a desired composition of gases at a desired pressure. In such implementations, the type and amount of the getter material 160 may be selected to achieve that desired composition of gases at that desired pressure. Alternatively and/or additionally, the getter material 160 may be employed to help maintain a desired composition of gases at a desired pressure within the gap 106 by removing one or more atmospheric gases or outgas emissions that may enter into the gap 106 over time. The getter material 160 is preferably affixed to the inner surface 171 of the outer wall 170 with an adhesive or any of a variety of forms of mounting hardware.

With the cooking utensil 100 assembled as described and depicted, the gaseous environment within the gap 106, the reflective layer 176 of the outer wall 170, and the non-conductive layer 177 of the outer wall 170 cooperate to maintain the outer surface 172 of the outer wall at a relatively cool temperature as the target layer 118 of the inner wall 110 is caused to become heated through magnetic induction. The gaseous environment within the gap 106 resists the transfer of heat emanating from the outer surface 112 of the inner wall 110 to the inner surface 171 of the outer wall 170. The reflective layer 176 of the outer wall 170 reflects a portion of the heat that does pass through the gaseous environment of the gap 106 away from the outer wall 170. The non-conductive layer 177 of the outer wall 170 resists transferring the heat that does pass through both the gaseous environment of the gap 106 and the reflective layer 176 to the outer surface 172.

Figure 8A:
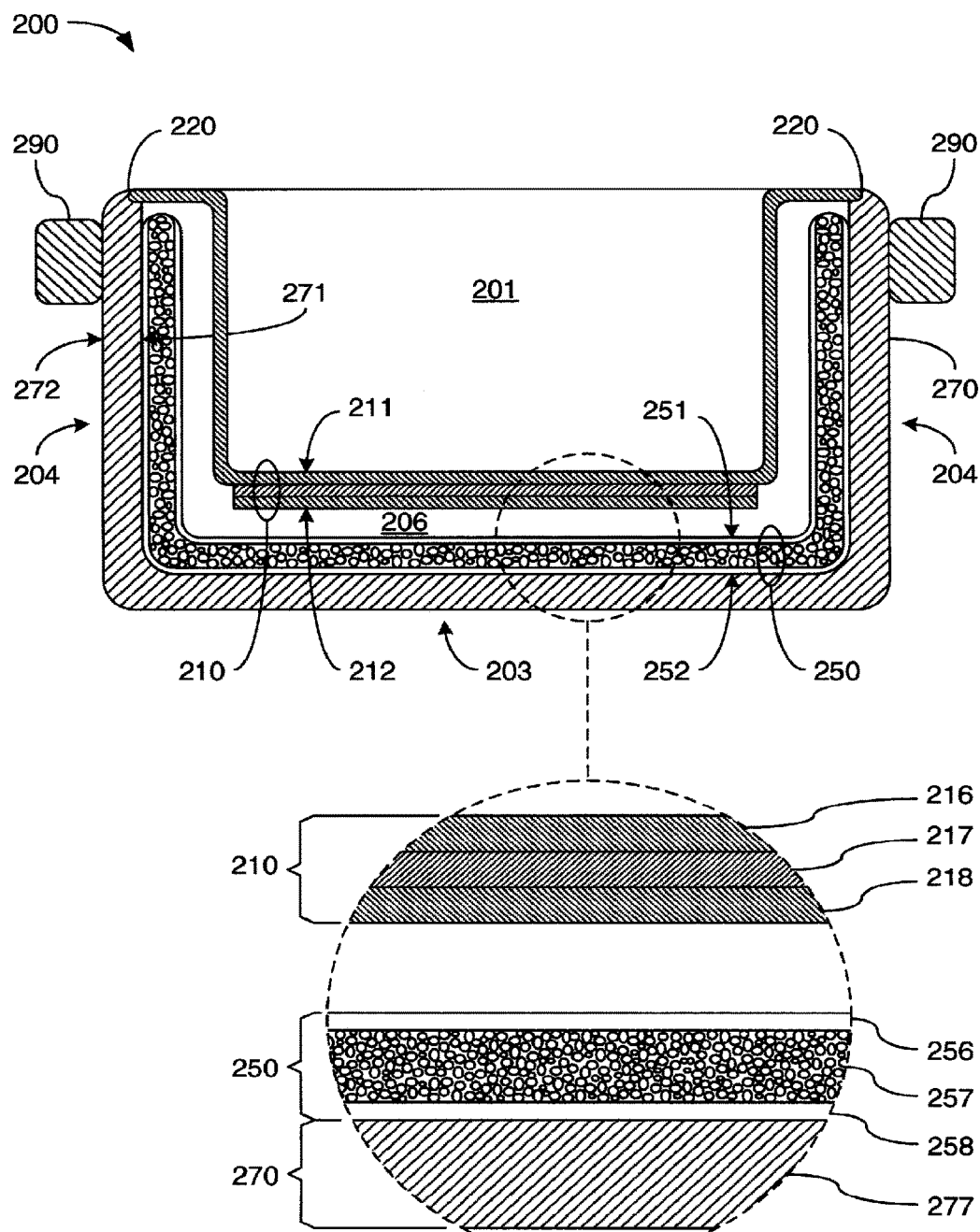
FIG. 8A is a cross-sectional view an induction cooking utensil.
Figure 8B:
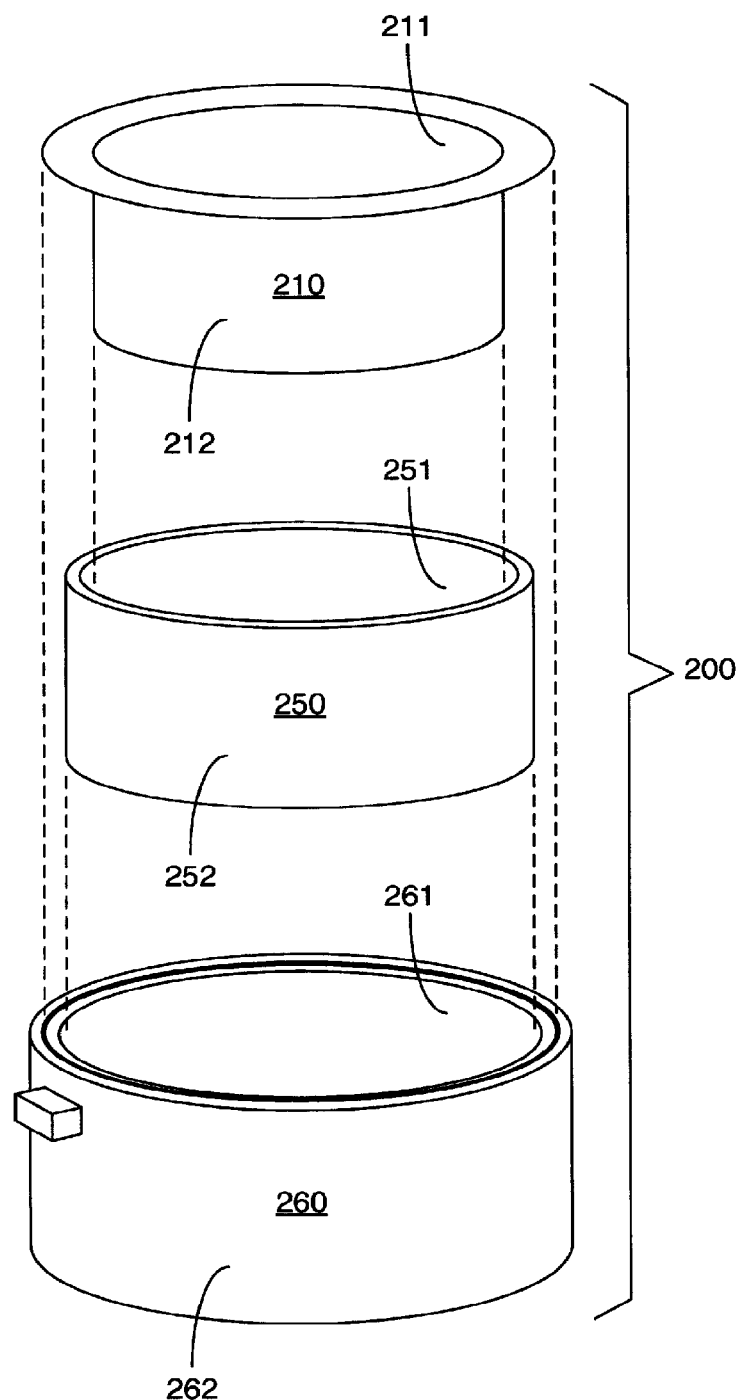
FIG. 8B is an exploded perspective view of the cooking utensil of FIG. 8A.

FIGS. 8A and 8B depict a cooking utensil 200 that has substantially similarities to the cooking utensil 50' of FIGS. 5C and 5D, and the cooking utensil 100 of FIG. 7. Like the cooking utensil 50', the cooking utensil 200 incorporates an inner wall 210, a vacuum-sealed thermal insulator 250 and an outer wall 270 that are all of a pan-like shape with the inner wall 210 nested within the thermal insulator 250 and the thermal insulator 250 nested within the outer wall 270. Also like the cooking utensil 50', the inner wall 210 is joined at a continuous annular joint 220 to the outer wall 270, thereby defining and fully enclosing a gap 206 between the inner wall 210 and the outer wall 270 within which the thermal insulator 250 is disposed. However, unlike the cooking utensil 50', the thermal insulator 250 of the cooking utensil 200 is a vacuum-sealed thermal insulator package incorporating a thermally resistant material 257 enclosed within a pair of sheets 256 and 258, and the gap 206 is filled with a gas that substantially resists transmitting heat. Also, unlike the cooking utensil 50', but like the cooking utensil 100, different portions of the inner wall 210 incorporate one and three layers. In light of the similarities between the cooking utensils 100 and 200, corresponding features are labeled with numerals in which the last two digits also correspond.

Referring to FIG. 8A, the inner wall 210 has an inner surface 211 defining a cooking chamber 201 and an outer surface 212 facing the thermal insulator 250 and the outer wall 270 beyond the thermal insulator 250. Within side wall portions 204 of the cooking utensil 200, the inner wall 210 incorporates a cooking layer 216, and within the bottom portion 203, the inner wall 210 additionally incorporates a spreader layer 217 and a target layer 218. The outer wall 270 has an inner surface 271 facing the thermal insulator 250 and the inner wall 210 beyond the thermal insulator 250, and an outer surface 272 defining much of the exterior of the cooking utensil 200. The outer wall 270 incorporates a non-conductive layer 277 that defines substantially all of the inner surface 271 and the outer surface 272. A substantial difference between the outer walls 170 and 270 is the lack of a reflective layer incorporated into the outer wall 270. However, it should be noted that despite this depiction of a single-layer outer wall 270, other implementations may additionally incorporate a reflective layer disposed on the inner surface 271 and/or decorative material disposed on the outer surface 272.

Portions of the inner wall 210 and the outer wall 270 meet at the joint 220, and the joint 220 cooperates with these portions of the inner wall 210 and the outer wall 270 to form a gas-tight seal that separates the environment within the gap 206 from the environment external to the gap 206. The gap 206 is filled with a gas that substantially resists transferring heat, and is preferably at a pressure that balances providing resistance to heat transfer with providing sufficient pressure within the gap 206 to resist the outer wall 270 being pressed into the gap 206. A substantial difference between the gaps 106 and 206 is the lack of a passage opening into the gap 206 by which a desired gaseous environment may be created and/or maintained within the gap 206. Another substantial difference between the gaps 106 and 206 is the lack of a piece of getter material disposed within the gap 206. However, those skilled in the art will readily recognize that other implementations of the cooking utensil 200 having one or both of such a passage and getter material may be resorted to.

The thermal insulator 250 has an inner surface 251 facing the outer surface 212 of the inner wall 210, and an outer surface 252 facing the inner surface 271 of the outer wall 270. The sheet 256 defines substantially all of the inner surface 251, and the sheet 258 defines substantially all of the outer surface 252. Depending on the ability of the composition of material from which the sheet 256 is made to withstand heat, the thermal insulator 250 is preferably disposed within the gap 206 with the inner surface 251 spaced away from the outer surface 212 of the inner wall 210 to avoid damage from direct contact with the inner wall 210 at times when the inner wall 210 is heated. In some implementations, this spaced apart position of the thermal insulator 250 from the inner wall 210 is accomplished by adhering or otherwise affixing the thermal insulator 250 to the inner surface 271 of the outer wall 270. One or both of the sheets 256 and 258 may be formed of a metalized polymer, a film of any of a variety of types incorporating silicon-dioxide, or other appropriate material having some degree of resistance to damage by exposure to heat and some degree of impermeability to gas molecules. The thermally resistant material 257 may be any of a variety of insulating materials including, and not limited to, a carbon aerogel or a silica aerogel incorporating carbon.

Referring to FIG. 8B, the thermal insulator 250 is preferably separately assembled prior to the assembly of the cooking utensil 200. Also, the outer surface 252 of the thermal insulator 250 is preferably affixed to the inner surface 271 of the outer wall 270 during assembly of the cooking utensil 200 to achieve the spaced apart relationship between the inner surface 251 and the outer surface 212 of the inner wall 210. As previously discussed, with the cooking utensil 200 assembled as described and depicted, the outer surface 212 of the inner wall 210 faces the inner surface 251 of the thermal insulator 250, and the outer surface 252 of the thermal insulator 250 faces the inner surface 271 of the outer wall 270.

The gaseous environment within the gap 206, the thermal insulator 250 and the outer wall 270 cooperate to maintain the outer surface 272 at a relatively cool temperature as the target layer 218 of the inner wall 210 is caused to become heated through magnetic induction. The gaseous environment within the gap 206 resists the transfer of heat emanating from the outer surface 212 of the inner wall 210 to the inner surface 251 of the thermal insulator 250. The thermally resistant material 257 of the insulator 250 resists the transfer of heat that does pass through the gaseous environment within the gap 206 between the inner surface 251 and the outer surface 252. The non-conductive layer 277 of the outer wall 270 resists transferring the heat that does pass through both the gaseous environment and the thermal insulator 250 between the inner surface 271 and the outer surface 272.

Figure 9:
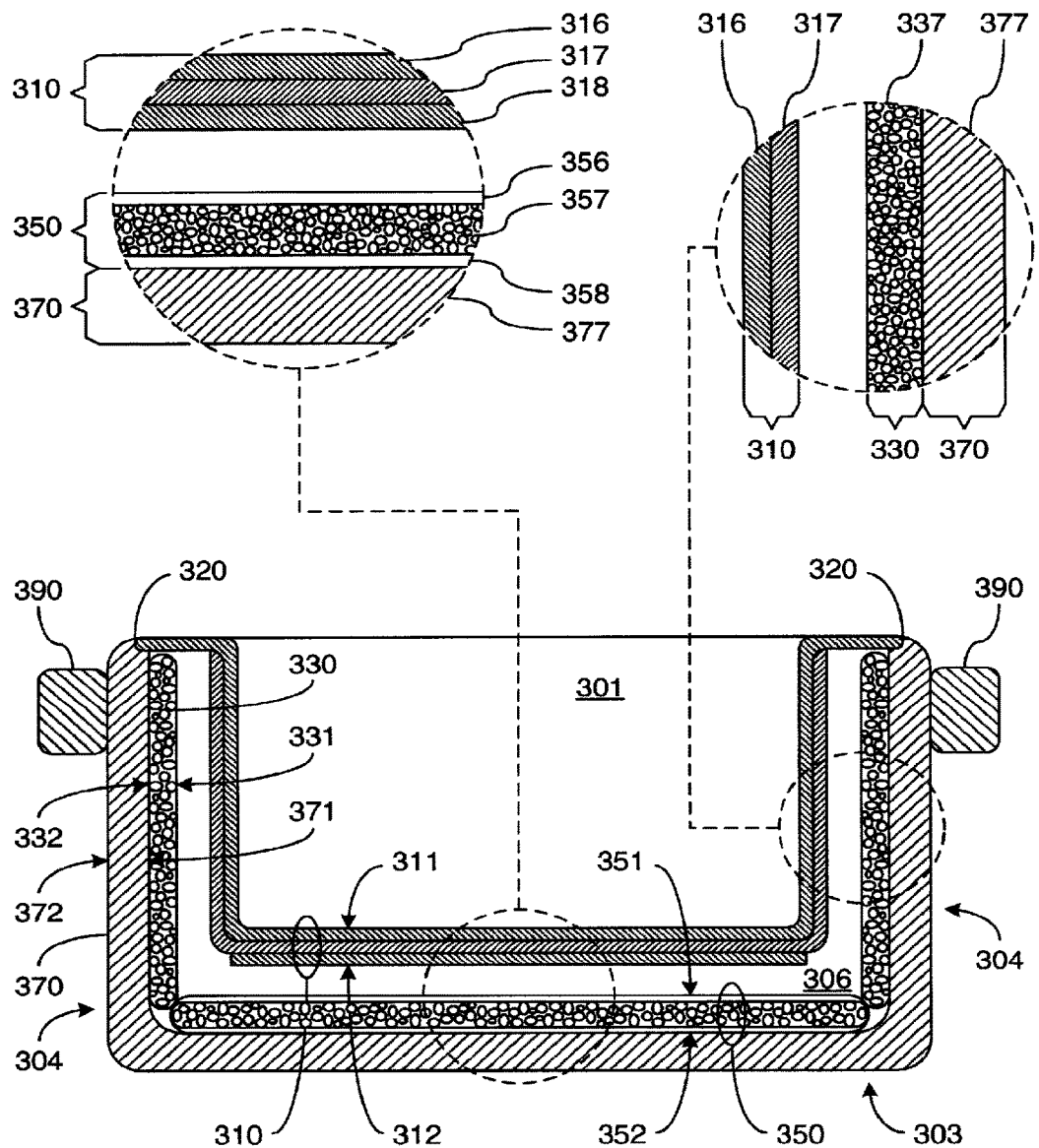
FIG. 9 is a cross-sectional view an induction cooking utensil.

FIG. 9 depicts a cooking utensil 300 that has substantial similarities to the cooking utensil 100 of FIG. 7, and the cooking utensil 200 of FIGS. 8A and 8B. Like the cooking utensil 200, the cooking utensil 300 incorporates an inner wall 310 and an outer wall 370 that are both of a pan-like shape with the inner wall 310 nested within the outer wall 370. Also like the cooking utensil 200, the inner wall 310 is joined at a continuous annular joint 320 to the outer wall 370, thereby defining and fully enclosing a gap 306 between the inner wall 310 and the outer wall 370 within which a vacuum-sealed thermal insulator 350 is disposed. However, unlike the cooking utensil 200, the thermal insulator 350 is not of a pan-like shape, is disposed substantially within the bottom portion 303 of the cooking utensil 300, and is accompanied by a thermal mat 330 disposed within the gap 306 within side wall portions 304 of the cooking utensil 300. Also unlike the cooking utensil 200, the inner wall 310 has two-layer and three-layer portions. In light of the similarities between the cooking utensil 300 and each of the cooking utensils 100 and 200, corresponding features are labeled with numerals in which the last two digits also correspond.

The inner wall 310 has an inner surface 311 defining a cooking chamber 301 and an outer surface 312. Within side wall portions 304 of the cooking utensil 300, the inner wall 310 incorporates a cooking layer 316 and a spreader layer 317, and within the bottom portion 303, the inner wall 310 additionally incorporates a target layer 318. The cooking layer 316 defines substantially all of inner surface 311 of the inner wall 310, while the outer surface 312 is defined by the spreader layer 317 within the side wall portions 304 and by the target layer 318 within the bottom portion 303. The portion of the outer surface 312 within the bottom portion 303 of the cooking utensil 300 faces the thermal insulator 350, while the portion of the outer surface 312 within the side wall portions 304 faces the thermal mat 330. Heat is generated in the target layer 318 of the inner wall 310 by a magnetic field generated by an induction coil of an induction cooktop. The spreader layer 317 conducts the heat generated in the target layer 318 to the cooking layer 316 while also spreading that heat more evenly so that the majority of the cooking layer 316 within both the bottom portion 303 and the side wall portions 304 of the cooking utensil 300 is able to provide a more evenly heated cooking surface.

The outer wall 370 has an inner surface 371 and has an outer surface 372 defining much of the exterior of the cooking utensil 300. The outer wall 370 incorporates a non-conductive layer 377 that defines substantially all of the inner surface 371 and the outer surface 372. The portion of the inner surface 371 within the bottom portion 303 of the cooking utensil 300 faces the thermal insulator 350, while the portion of the inner surface 371 within the side wall portions 304 faces the thermal mat 330.

Portions of the inner wall 310 and the outer wall 370 meet at the joint 320, and the joint 320 cooperates with these portions of the inner wall 310 and the outer wall 370 to form a gas-tight seal that separates the environment within the gap 306 from the environment external to the gap 306. The gap 306 is filled with a gas that substantially resists transferring heat, and is preferably at a pressure that balances providing resistance to heat transfer with providing sufficient pressure within the gap 306 to resist the outer wall 370 being pressed into the gap 306.

The thermal insulator 350 is disposed within the bottom portion 303 of the cooking utensil 300, has an inner surface 351 facing the outer surface 312 of the inner wall 310, and an outer surface 352 facing the inner surface 371 of the outer wall 370. The thermal insulator 350 incorporates a thermally resistant material 357 and a pair of sheets 356 and 358 between which the thermally resistant material 357 is vacuum-sealed. The sheet 356 defines substantially all of the inner surface 351, and the sheet 358 defines substantially all of the outer surface 352. Depending on the composition of material from which the sheet 356 is made, the thermal insulator 350 is preferably disposed within the gap 306 with the inner surface 351 spaced away from the outer surface 312 of the inner wall 310 to avoid damage from direct contact with the inner wall 310 at times when the inner wall 310 is heated.

The thermal mat 330 is disposed within the side wall portions 304 of the cooking utensil 300, has an inner surface 331 facing the outer surface 312 of the inner wall 310, and an outer surface 332 facing the inner surface 371 of the outer wall 370. The thermal mat may be formed of any of a variety of insulating materials including, and not limited to, fibrous material supporting particles of a aerogel (e.g., a silica aerogel incorporating carbon black). The thermal mat 330 is preferably disposed within the gap 306 with the inner surface 331 spaced away from the outer surface 312 of the inner wall 310 to avoid damage from direct contact with the inner wall 310 at times when the inner wall 310 is heated.

With the cooking utensil 300 assembled as described and depicted, the gaseous environment within the gap 306, the thermal mat 330, the thermal insulator 350, and the outer wall 370 cooperate to maintain the outer surface 372 at a relatively cool temperature as the target layer 318 of the inner wall 310 is caused to become heated through magnetic induction. The gaseous environment within the gap 306 resists the transfer of heat emanating from the outer surface 312 of the inner wall 310 to both the inner surface 331 of the thermal mat 330 and the inner surface 351 of the thermal insulator 350. The thermal mat 330 resists the transfer of heat that does pass through the gaseous environment within the gap 306 between the inner surface 331 and the outer surface 332, and the thermal insulator 350 resists the transfer of heat between the inner surface 351 and the outer surface 352. The non-conductive layer 377 of the outer wall 370 resists transferring the heat that does pass through both the gaseous environment and either the thermal mat 330 or the thermal insulator 350 to the outer surface 372.

Figure 10:
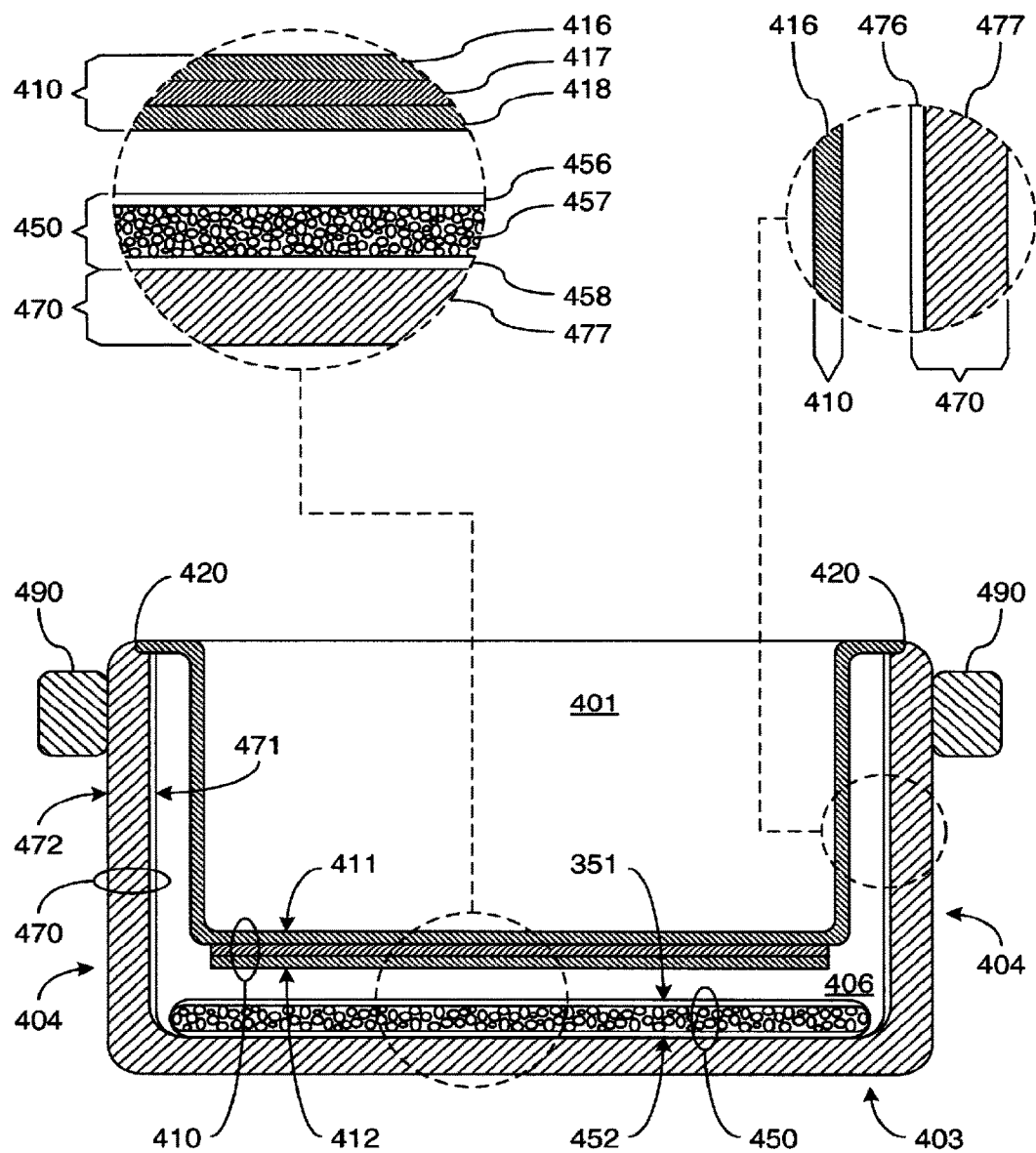
FIG. 10 is a cross-sectional view an induction cooking utensil.

FIG. 10 depicts a cooking utensil 400 that has substantial similarities to the cooking utensil 100 of FIG. 7, and the cooking utensil 300 of FIG. 9. Like the cooking utensil 300, the cooking utensil 400 incorporates an inner wall 410 and an outer wall 470 that are both of a pan-like shape with the inner wall 410 nested within the outer wall 470. Also like the cooking utensil 300, the inner wall 410 is joined at a continuous annular joint 420 to the outer wall 470, thereby defining and fully enclosing a gap 406 between the inner wall 410 and the outer wall 470 within which a vacuum-sealed thermal insulator 450 is disposed. Further, like the cooking utensil 300, the thermal insulator 450 is not of a pan-like shape, and is disposed within the gap 406 substantially within the bottom portion 403 of the cooking utensil 400. However, unlike the cooking utensil 300, and more like the cooking utensil 100, the inner wall 410 has one-layer and three-layer portions, and within the side wall portions 404 of the cooking utensil, the outer wall 470 incorporates a reflective layer 476. In light of the similarities between the cooking utensil 400 and each of the cooking utensils 100 and 300, corresponding features are labeled with numerals in which the last two digits also correspond.

The inner wall 410 has an inner surface 411 defining a cooking chamber 401 and an outer surface 412. Within side wall portions 404 of the cooking utensil 400, the inner wall 410 incorporates a cooking layer 416, and within the bottom portion 403, the inner wall 410 additionally incorporates a spreader layer 417 and a target layer 418. The cooking layer 416 defines substantially all of inner surface 411 of the inner wall 410, while the outer surface 412 is defined by the cooking layer 416 within the side wall portions 404 and by the target layer 418 within the bottom portion 403. The portion of the outer surface 412 within the bottom portion 403 of the cooking utensil 400 faces the thermal insulator 450, while the portion of the outer surface 412 within the side wall portions 404 faces the reflective layer 476 of the outer wall 470. Heat is generated in the target layer 418 of the inner wall 410 by a magnetic field generated by an induction coil of an induction cooktop. The spreader layer 417 conducts the heat generated in the target layer 418 to the cooking layer 416 while also spreading that heat more evenly so that at least the portion of the cooking layer 416 that is within the bottom portion 403 is able to provide a more evenly heated cooking surface.

The outer wall 470 has an inner surface 471 and has an outer surface 472 defining much of the exterior of the cooking utensil 400. Within the bottom portion 403 of the cooking utensil 400, the outer wall 470 incorporates a non-conductive layer 477, and within the side wall portions 404, the outer wall 470 additionally incorporates a reflective layer 476. The non-conductive layer 477 defines substantially all of the outer surface 472 of the outer wall 470, while the inner surface 471 is defined by the reflective layer 476 within the side wall portions 404 and by the non-conductive layer 477 within the bottom portion 403. The portion of the inner surface 471 within the bottom portion 403 of the cooking utensil 400 faces the thermal insulator 450, while the portion of the inner surface 471 within the side wall portions 404 faces the inner wall 410. It should be noted that despite this depiction of the reflective layer 476 being within only the side wall portions 404, other implementations may incorporate the reflective layer 476 in both bottom portion 403 or the side wall portions 404.

Portions of the inner wall 410 and the outer wall 470 meet at the joint 420, and the joint 420 cooperates with these portions of the inner wall 410 and the outer wall 470 to form a gas-tight seal that separates the environment within the gap 406 from the environment external to the gap 406. The gap 406 is filled with a gas that substantially resists transferring heat, and is preferably at a pressure that balances providing resistance to heat transfer with providing sufficient pressure within the gap 406 to resist the outer wall 470 being pressed into the gap 406.

The thermal insulator 450 is disposed within the bottom portion 403 of the cooking utensil 400, has an inner surface 451 facing the outer surface 412 of the inner wall 410, and an outer surface 452 facing the inner surface 471 of the outer wall 470. As depicted, the thermal insulator 450 is substantially coplanar with the target layer 418 of the inner wall 410, but has a larger surface area than the target layer 418 such that the edges of the thermal insulator 450 extend further across the bottom portion 403 of the cooking utensil 400 than the target layer 418. This greater reach of the thermal insulator 450 across the bottom portion 403 may be deemed desirable to help resist the transmission of heat to locations where portions of the outer wall 470 within the side wall portions 404 and the bottom portion 403 meet. The thermal insulator 450 incorporates a thermally resistant material 457 and a pair of sheets 456 and 458 between which the thermally resistant material 457 is vacuum-sealed. The sheet 456 defines substantially all of the inner surface 451, and the sheet 458 defines substantially all of the outer surface 452. Depending on the composition of material from which the sheet 456 is made, the thermal insulator 450 is preferably disposed within the gap 406 with the inner surface 451 spaced away from the outer surface 412 of the inner wall 410 to avoid damage from direct contact with the inner wall 410 at times when the inner wall 410 is heated.

With the cooking utensil 400 assembled as described and depicted, the gaseous environment within the gap 406, the thermal insulator 450, the reflective layer 476 and the non-conductive layer 477 cooperate to maintain the outer surface 472 at a relatively cool temperature as the target layer 418 of the inner wall 410 is caused to become heated through magnetic induction. The gaseous environment within the gap 406 resists the transfer of heat emanating from the outer surface 412 of the inner wall 410 to both the inner surface 451 of the thermal insulator 450 and the reflective layer 476 of the outer wall 470. The thermal insulator 450 resists the transfer of heat that does pass through the gaseous environment within the gap 406 between the inner surface 451 and the outer surface 452, and the reflective layer 476 reflects heat away from the outer wall 470. The non-conductive layer 477 of the outer wall 470 resists transferring the heat that does pass through both the gaseous environment and either the thermal insulator 450 or the reflective layer 476 to the outer surface 472.

It should be noted that despite the description of the gaps 106, 206, 306 and 406 of the cooking utensils 100, 200, 300 and 400, respectively, as being filled with a gas, other implementations of one or more of these cooking utensils may be resorted to in which a vacuum is enclosed in one or more of these gaps.

A number of embodiments of the invention have been described. Nevertheless, it will be understood that various modifications may be made without departing from the spirit and scope of the invention, and, accordingly, other embodiments are within the scope of the following claims.

What is claimed:

1. A cooking utensil for use with an induction cooktop having an induction coil, the cooking utensil comprising:
   an inner wall comprising an electrically conductive target layer in which heat is generated by the induction coil;
   an outer wall within which the inner wall is nested, the outer wall comprising an electrically non-conductive layer, wherein the outer wall cooperates with the inner wall to form a sealed gap between the inner wall and the outer wall and further cooperates with the inner wall to provide the cooking utensil a pan shape having a bottom portion, wherein at least a portion of the electrically conductive target layer is disposed along a bottom portion of the inner wall; and
   a thermally resistive material disposed within the gap within at least a portion of the bottom portion of the cooking utensil, wherein a surface of the thermally resistive material faces towards the inner wall and the entirety of the thermally resistive material is spaced away from contact with the inner wall by a portion of the gap.

2. The cooking utensil of claim 1, wherein the outer wall further comprises a reflective layer disposed on a surface of the outer wall that defines a portion of the gap and faces the inner wall.

3. The cooking utensil of claim 2, wherein the reflective layer is segmented such that the reflective layer is non-contiguous to interrupt a flow of a current induced in the reflective layer by the induction coil.

4. The cooking utensil of claim 1, wherein the outer wall further comprises an impermeable material to aid in reducing the permeation of an atmospheric gas through the outer wall and into the gap.

5. The cooking utensil of claim 1, wherein the thermally resistive material is one of the group consisting of: a silica aerogel and a silica aerogel with carbon.

6. The cooking utensil of claim 1, wherein the thermally resistive material is affixed to an inner surface of the outer wall.

7. The cooking utensil of claim 1, wherein the inner wall further comprises a heat spreader layer and a cooking layer.

8. The cooking utensil of claim 7, wherein:
   the inner wall has a pan shape having a flat bottom portion, having an inner surface defining a cooking chamber, and having an outer surface that defines a portion of the gap and faces the outer wall;
   the cooking layer provides all of the inner surface;
   the target layer provides the outer surface within the bottom portion of the inner wall; and
   the heat spreader layer conducts heat generated in the target layer to at least the cooking layer.

9. A cooking utensil for use with an induction cooktop having an induction coil, the cooking utensil comprising:
   an inner wall comprising an electrically conductive target layer in which heat is generated by the induction coil;
   an outer wall comprising an electrically non-conductive layer that cooperates with the inner wall to form a sealed gap between the inner wall and the outer wall; and
   a thermally resistive material disposed within the gap, wherein a surface of the thermally resistive material faces towards the inner wall and the entirety of the thermally resistive material is spaced away from contact with any portion of the inner wall comprising the electrically conductive target layer;
   wherein the thermally resistive material is affixed to an inner surface of the outer wall.

10. The cooking utensil of claim 9, wherein the outer wall further comprises an impermeable material to aid in reducing the permeation of an atmospheric gas through the outer wall and into the gap.

11. The cooking utensil of claim 9, wherein the inner wall further comprises a heat spreader layer and a cooking layer.

12. The cooking utensil of claim 11, wherein the inner wall has a pan shape having a flat bottom portion, having an inner surface defining a cooking chamber, and having an outer surface that defines a portion of the gap and faces the outer wall, wherein:
   the cooking layer provides all of the inner surface;
   the electrically conductive target layer provides the outer surface of the bottom portion of the inner wall; and
   the heat spreader layer conducts heat generated in the electrically conductive target layer to at least the cooking layer.

13. The cooking utensil of claim 9, wherein the thermally resistive material is one of the group consisting of: a silica aerogel and a silica aerogel with carbon.

14. The cooking utensil of claim 9, wherein
   the inner wall and the outer wall cooperate to provide the cooking utensil a pan shape having a bottom portion and a side wall portion, and wherein the inner wall is nested within the outer wall; and
   the thermally resistive material is disposed within a portion of the gap within the bottom portion of the cooking utensil.

15. The cooking utensil of claim 14, further comprising a reflective layer disposed on a surface of the outer wall that faces the inner wall.

16. The cooking utensil of claim 14, further comprising a thermal mat disposed within a portion of the gap within the side wall portion, wherein the thermal mat comprises an aerogel, and wherein the thermal mat is affixed to a surface of the outer wall that defines a portion of the gap.

17. The cooking utensil of claim 14, wherein the electrically conductive target layer is disposed along the bottom portion of the cooking utensil, and wherein the thermally resistive material extends further across the bottom portion of the cooking utensil than does the target layer.

18. A method of making a cooking utensil, the method comprising:
   joining an outer wall comprising an electrically non-conductive layer to an inner wall comprising an electrically conductive target layer in which heat is able to be generated by an induction coil of an induction cooktop to define a gap between the inner wall and the outer wall such that the inner wall is nested within the outer wall and such that the inner wall and the outer wall cooperate to provide the cooking utensil with a pan shape having a bottom portion wherein at least a portion of the electrically conductive target layer is disposed along a bottom portion of the inner wall; and
   disposing within the gap, with a surface that faces the inner wall and the entirety of which is spaced away from contact with the inner wall within at least a portion of the bottom portion of the cooking utensil, a thermally resistive material, and;
   adhering the thermally resistive material to an inner surface of the outer wall.

19. A cooking utensil for use with an induction cooktop having an induction coil, the cooking utensil comprising:

an inner wall comprising an electrically conductive target layer in which heat is generated by the induction coil;

an outer wall within which the inner wall is nested, the outer wall comprising an electrically non-conductive layer, wherein the outer wall cooperates with the inner wall to form a sealed gap between the inner wall and the outer wall and further cooperates with the inner wall to provide the cooking utensil a pan shape having a bottom portion, wherein at least a portion of the electrically conductive target layer is disposed along a bottom portion of the inner wall; and a thermally resistive material disposed within the gap within at least a portion of the bottom portion of the cooking utensil, wherein a surface of the thermally resistive material faces towards the inner wall and the entirety of the thermally resistive material is spaced away from contact with the inner wall by a portion of the gap;

wherein the thermally resistive material comprises a silica aerogel with carbon.

* * * * *